United States Patent [19]
Maruyama et al.

[11] Patent Number: 5,307,153
[45] Date of Patent: Apr. 26, 1994

[54] THREE-DIMENSIONAL MEASURING APPARATUS

[75] Inventors: Tsugito Maruyama, Machida; Shinji Kanda, Yokohama; Jun Wakitani, Kawasaki, all of Japan

[73] Assignee: Fujitsu Limited, Kawasaki, Japan

[21] Appl. No.: 113,745

[22] Filed: Aug. 31, 1993

Related U.S. Application Data

[63] Continuation of Ser. No. 717,905, Jun. 19, 1991, abandoned.

[30] Foreign Application Priority Data

Jun. 19, 1990 [JP] Japan ................................ 2-158799
Jun. 26, 1990 [JP] Japan ................................ 2-165560
Oct. 18, 1990 [JP] Japan ................................ 2-277660

[51] Int. Cl.$^5$ ............................................. G01B 11/24
[52] U.S. Cl. .................................................... 356/376
[58] Field of Search ........................................ 356/376

[56] References Cited

U.S. PATENT DOCUMENTS 4,212,073 7/1980 Balasubramanian ................ 356/376
4,952,149 8/1990 Duret et al. .......................... 356/376

*Primary Examiner*—Richard A. Rosenberger
*Attorney, Agent, or Firm*—Staas & Halsey

[57] ABSTRACT

A three-dimensional measuring apparatus including a multi-slit projector has an actuator for displacing at least one of first and second diffraction gratings by only a minute distance in a direction perpendicular to the slit lights. An image recognizing apparatus includes an image arithmetic unit for changing, each time a coded multi-slit light pattern is changed, weights assigned to the binarized image signals, and for summing up the last weighted binarized image signals or the image signals of the last added results read out from an image memory with newly weighted binarized image signals. This improves the image resolution reduces the memory capacity and increases the processing speed.

7 Claims, 18 Drawing Sheets

Fig. 16

| | |
|---|---|
| F1 | PROJECT <u>A</u> PATTERN → STORE IN M1 |
| F2 | M1 → BINARIZATION → M2 (IA)<br>PROJECT <u>B</u> PATTERN → STORE IN M3 |
| F3 | M3 → BINARIZATION → M4 (IB) |
| F4 | M2, M4 → ADD → M1 (IS) |
| F5 | PROJECT <u>C</u> PATTERN → STORE IN M3 |
| F6 | M3 → BINARIZATION → M4 (IC) |
| F7 | M1, M4 → ADD → M2 (IS) |
| F8 | M2 → BINARIZATION → STORE IN CODED PATTERN IRRADIATED POINT MEMORY |

THREE-DIMENSIONAL MEASURING APPARATUS

This application is a continuation of application Ser. No. 07/717,905, filed Jun. 19, 1991, now abandoned.

BACKGROUND OF THE INVENTION (1) Field of the Invention

The present invention relates to a three-dimensional measuring apparatus for measuring a shape of an object by projecting multi-slit lights on the object to obtain a three-dimensional measurement.

(2) Description of the Related Art

In the fields involving a three-dimensional visual function for recognizing an object to be measured for use in a robot or other various automatic apparatuses, or a shape input apparatus for measuring the shape of the object to be input, there is a known arrangement in which a slit light is irradiated by a projector onto the object to be measured. The object is then scanned and imaged by an imaging unit from an angle different from the irradiating direction to calculate the distance from the observation point to the slit light irradiated point based on the triangulation. Thus, the shape of the object to be measured is recognized.

Instead of scanning the slit light, a multi-slit projector which irradiates a plurality of parallel slit lights to enable a plurality of points to be measured at the same time can be used. In this case, the resolution in the measurement of the object to be measured is determined by the resolution of the imaging apparatus and the pitch between the slit lights irradiated from the projector. Thus, the resolution in the measurement of the object is not accurate and must be improved.

In the three-dimensional multi-slit measuring apparatus, multi-slit lights are projected onto an object to be measured, the projected image is picked up by an image pick up unit such as a television camera, and a reference slit light is determined among the projected multi-slit lights to calculate a distance from an observation point to a coded pattern irradiated point of the object to be measured. In this apparatus, however, the speeding at which the measurement is made must be increased.

SUMMARY OF THE INVENTION

An object of the present invention is to improve the resolution for three-dimensional measurement using an apparatus having a simple constitution.

Another object of the present invention is to increase the speed of the three-dimensional measurement of the object to be measured.

Still another object of the present invention is to reduce the memory capacity of an apparatus for performing a three-dimensional measurement.

To attain the first object, there is provided, according to the present invention, a three-dimensional measuring apparatus for measuring the shape of an object by projecting multi-slit lights onto the object, comprising a multi-slit projector for projecting the multi-slit lights, the multi-slit projector including: a light source for emitting parallel light; first and second diffraction gratings for receiving the parallel light from the light source and for diffracting the parallel lights in directions perpendicular to each other; a cylindrical lens on which output lights diffracted by the first and second diffraction gratings are incident and which produces a plurality of parallel slit lights dispersed in the diffractive direction of either one of the first and second diffraction gratings; a shutter array for obstructing predetermined slit lights among the parallel slit lights from the cylindrical lens, to thereby form a code; and an actuator for displacing a configuration including at least one of the first and second diffraction gratings by only a minute distance in a direction perpendicular to the parallel slit lights.

To attain the second object of the present invention, there is provided a three-dimensional measuring apparatus comprising a multi-slit projector for projecting a coded multi-slit light pattern onto an object to be measured, and an image recognizing apparatus, the image recognizing apparatus comprising: an image pick up unit for picking up the coded multi-slit light pattern projected onto the object; a binarization circuit for binarizing the image signals from the image pick up unit; an image arithmetic unit for changing, each time the coded multi-slit light pattern is changed, weights assigned to the binarized image signals obtained by the binarization circuit, and for summing up the last weighted binarized image signals or the image signals of the last added results read out from an image memory, with newly weighted binarized image signals; a coded pattern irradiated point memory for storing a coordinate of a coded pattern irradiated point of the object, the coordinate corresponding to the multi-slit light which is decoded from the final arithmetic results of the image arithmetic unit; and a distance calculating unit for calculating a three-dimensional position of the coded pattern irradiated point of the object, based on the coordinates of the coded pattern irradiated points stored in the coded pattern irradiated point memory.

To attain the third object of the present invention, there is provided a three-dimensional measuring apparatus comprising a multi-slit projector for projecting coded multi-slit light patterns onto an object to be measured and an image recognizing apparatus, the image recognizing apparatus comprising: an image pick up unit for forming the coded multi-slit light patterns projected onto the object to be measured; a binarization circuit for binarizing image signals from the image pick up unit; a plurality of image memories for storing binary image signals from the binarization circuit, the binary image signals respectively corresponding to the coded multi-slit light patterns; an address generation circuit for generating address signals for the plurality of image memories; and a distance calculation unit for determining three dimensional positions of coded pattern irradiated points of the object to be measured, based on the address signals from the address generation circuit and a slit light number having a bit configuration composed of the binary image signals simultaneously read out from the plurality of image memories by the address signals.

According to still another aspect of the present invention, there is provided a three-dimensional measuring apparatus comprising a multi-slit projector for projecting coded multi-slit light patterns onto an object to be measured, and a image recognizing apparatus, the image recognizing apparatus comprising: an image pick up unit including a plurality of light receiving elements each picking up the coded multi-slit light patterns projected onto the object to be measured; a plurality of binarization circuits corresponding to the light receiving elements, each binarizing the corresponding output of the light receiving elements; a plurality of shift registers, corresponding to the light receiving elements, for shifting and storing the output signals of the binarization circuits corresponding to, the light receiving elements each time the coded multi-slit light patterns are changed, the shift registers being a serial-in /parallel-out type; an address generation circuit for producing address signals for specifying the shift registers corresponding to the light receiving elements; and a distance calculation unit for determining three-dimensional positions of coded pattern irradiated points of the object to be measured, based on the address signals from the address generation circuit, and a slit light number having a bit configuration read-out in parallel from the shift registers corresponding to the light receiving elements specified by the address signals.

BRIEF DESCRIPTION OF THE DRAWINGS

The above objects and features of the present invention will be more apparent from the following description of the preferred embodiments with reference to the accompanying drawings, wherein:

FIG. 16 is diagram explaining a pipeline processing according to still another embodiment of the present invention;

DESCRIPTION OF THE PREFERRED EMBODIMENTS

For a better understanding of the present invention, the conventional art will first be described with reference to FIG. 1 to FIG. 3.

Figure 1:
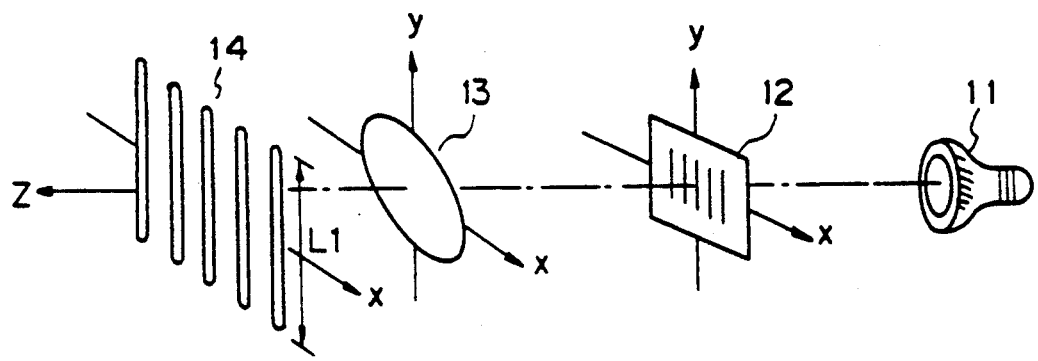
FIG. 1 is a diagram of a conventional a projector in a three-dimensional measuring apparatus.

FIG. 1 is a conventional multi-slit projector for irradiating a plurality of parallel lights. In FIG. 1, a light from a high-brightness lamp 11 such as a xenon lamp is incident upon a lens 13 through slits 12 which produce a plurality of slit lights 14 irradiating an object to be measured. In this case, the slits 12 and lens 13 are selected so as to be capable of obtaining a desired length L1 of the slit lights 14.

Figure 2:
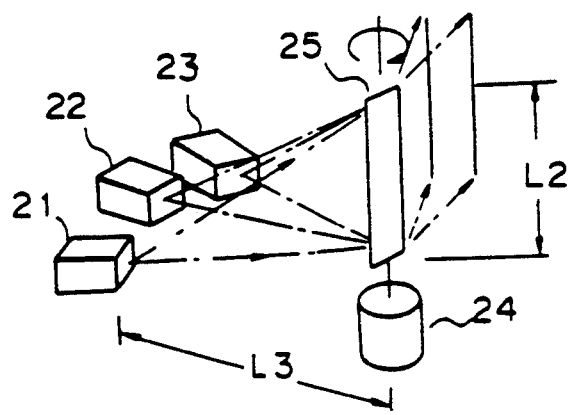
FIG. 2 is a diagram of another conventional projector.

FIG. 2 shows another conventional example in which, through a combination of a semiconductor laser, a collimating lens, a cylindrical lens, etc., a plurality of light sources 21, 22, and 23 for irradiating slit lights on a mirror 25 are arranged circumferentially around the rotational shaft of a motor 24, and the mirror 25 is rotated by the motor 24 to irradiate the slit lights onto the object to be measured. Additional light sources may be arranged.

The length L2 of the mirror 25 is, for example, 12 cm, and the distance between the rotational shaft of the motor 24 and the light sources 21, 22, 23 is set, for example, to 20 cm, thus leading to a comparatively large-sized configuration.

Prior to the present invention, there was also provided an apparatus in which a coded multi-slit light is projected onto the object to be measured, to execute a three-dimensional measurement. The multi-slit projector in the three-dimensional measuring apparatus, for example, has a construction as shown in FIG. 3, in which laser lights having a single wavelength emitted from a semiconductor laser 31 are focused to produce parallel light beams incident on a first diffraction grating 34 which produces an output light 38 consisting of spot lights beams arranged in the y-axis direction. The spot light beams strike a second diffraction grating 35. The diffraction grating 35 is formed so that its diffractive direction is perpendicular to the first diffraction grating 34. Thus the spot light beams become output light beams arranged in a plurality lines and which fall on a cylindrical lens 33. The first and second diffraction gratings 34 and 35 may be formed of optical fibers having a diameter of, for example, about 20 to 70 μm, and arranged in a plane.

The cylindrical lens 33 is extended in the x-axis direction, which produces an output light 40 in the form of a multi-slit light consisting of spot lights linked in the y-axis. In this case, providing that the cylindrical lens 33 is extended in the y-axis direction, the output light 40 is a multi-slit light consisting of spot lights linked in the x-direction. The output light 40 arrives at the shutter array 37, which produces a coded multi-slit light pattern 36 by a selective opening and closing of the shutter array. The shutter array 37 may be formed, for example, by liquid crystal shutters utilizing a polarization effect, or shutters utilizing electro-optical effect elements.

Figure 9:
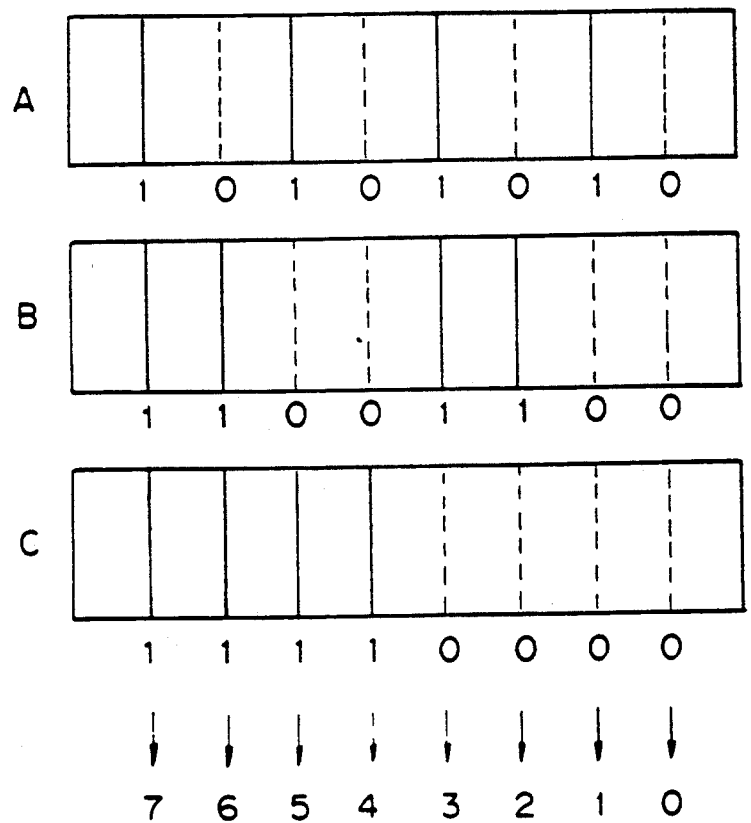
FIG. 9 is a diagram explaining a conventional coded multi-slit light pattern.

FIG. 9 is an explanatory drawing of the conventional coded multi-slit light pattern, in which different patterns A, B, and C are projected in sequence to produce patterns of eight slit lights. The pattern A has an alternate slit light pattern, the pattern B has an alternate pair of slit light patterns, and the pattern C has an alternate adjacent four slit light pattern. Each time these three kinds of coded multi-slit light patterns are projected, picked-up image signals are stored in the image memory. For example, at a position of a slit light corresponding to stored image signals, when "1" is read for the pattern A, "0" for the pattern B, and "1" for the pattern C, "C, B, A"="101" is obtained, whereby it can be recognized that the slit light is the No. 5 slit light. That is, provided that "n" kinds of multi-slit light patterns are projected for $2^n$ slit lights, all of the slit numbers can be recognized. In this manner, since respective numbers of the multi-slit lights projected on the object to be measured are identified, the position of each point of the object to be measured can be three-dimensionally calculated, to thereby determine the three-dimensional configuration thereof.

In the three-dimensional measuring means using the slit lights, the measurement must have an accuracy equal or superior to that of the pixel resolution of the imaging apparatus. In the above-mentioned conventional example shown in FIG. 1, the width of the slit light is determined by the slit 12, which usually makes the slit light width larger than the pixel of the imaging apparatus, partially because the light source 11 does not emit parallel light and the phases of the lights are different. Thus an image of light overlaps two pixels of the apparatus, and accordingly, it is difficult to improve the resolution.

Further, in the conventional three-dimensional measuring apparatus shown in FIG. 1, slit lights are projected onto the object to be measured, and picked up on a two-dimensional plane in the form of coordinates, to measure the distance from an observation point. A drawback arises in that the measuring time is prolonged due to the necessity for a successive scanning.

Conversely, the conventional examples shown in FIG. 2 have a brightness distribution of the slit lights in the sectional direction in the form of a Gaussian distribution. Accordingly, even though the slit light image overlaps two pixels, the center of the slit light can be determined by a weighted operation or comparative operation, to thereby improve the pixel resolution.

Nevertheless, when a high-speed three-dimensional measurement is carried out for the object to be measured, 50 to 60 or more slit lights are needed. Therefore, the conventional example shown in FIG. 2 must have several tens of light sources arranged circumferentially around the rotational shaft of the motor 24. This results in an enlargement of the apparatus size and a higher production cost, and thus it is difficult to put the apparatus to practical use.

Furthermore, to realize a visual function for use in a robot or other automatic apparatuses, a multi-slit projector must be mounted on a moving body, which requires miniaturization. The conventional example as shown in FIG. 1, however, uses a high-brightness lamp 11, which prevents such a miniaturization. Also, as described earlier, it is difficult to miniaturize the conventional example shown in FIG. 2.

Figure 3:
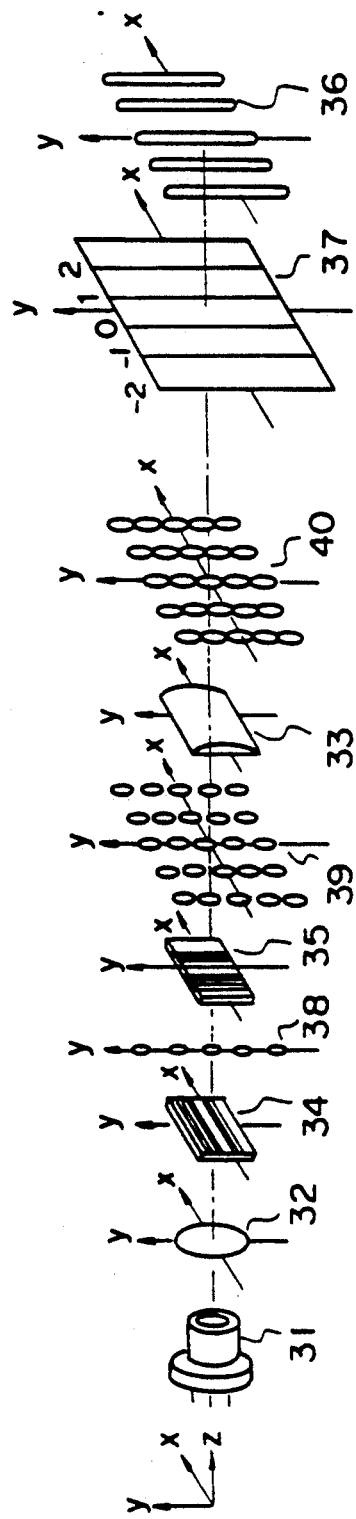
FIG. 3 is a diagram of a multi-slit projector provided prior to the present invention.

Conversely, the miniaturization of the multislit projector shown in FIG. 3 is easy because it employs only the single semiconductor laser 31, the first and the second diffraction gratings 34 and 35, and the cylindrical lens 33, to obtain a multi-slit light.

Nevertheless, this has a disadvantage in that it is impossible to measure the portion between the slits, and thus the pixel resolution is analogous to that of the conventional example shown in FIG. 1.

A multi-slit projector in a three-dimensional measuring apparatus according to an embodiment of the present invention is now described with reference to FIG. 4.

Figure 4:
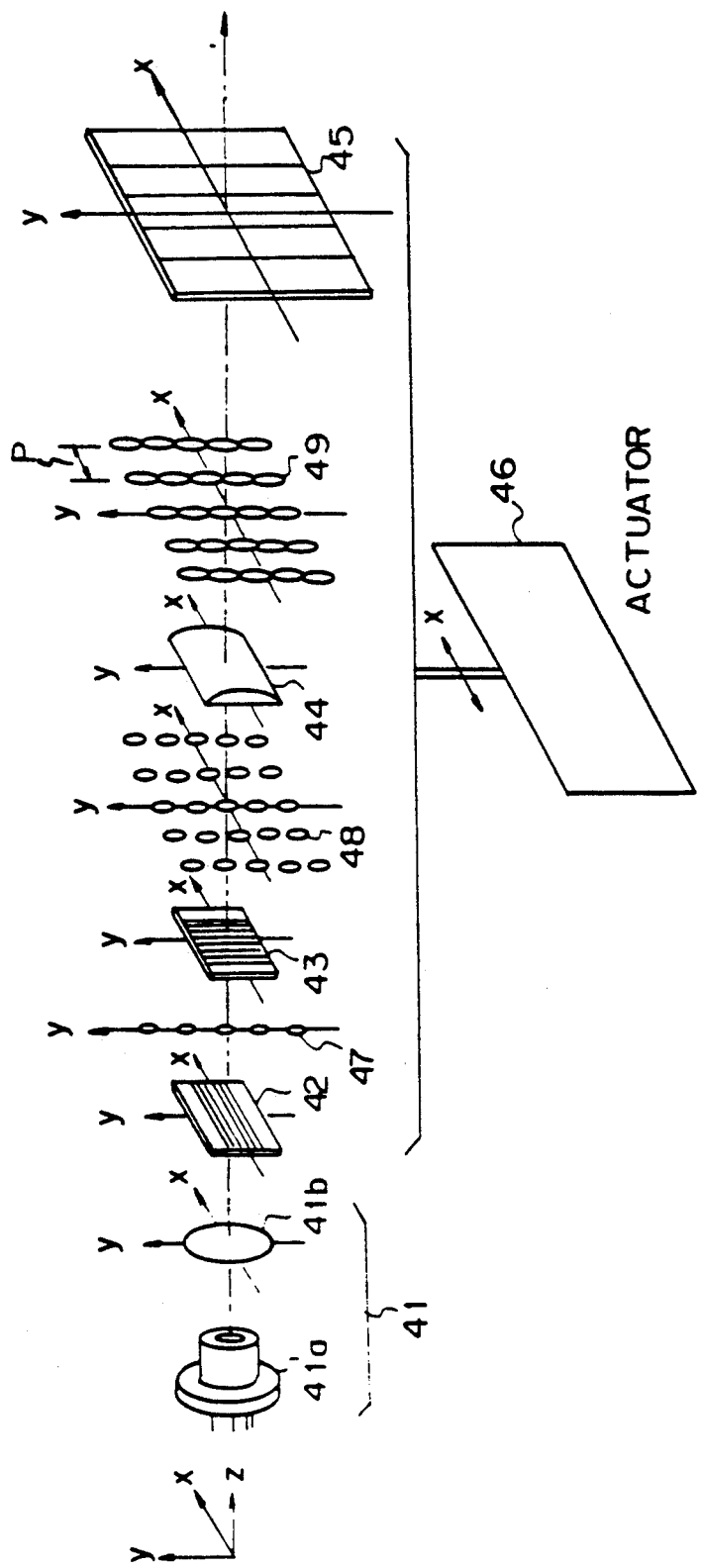
FIG. 4 is a diagram principally showing a projector in a three-dimensional measuring apparatus according to the present invention.

The multi-slit projector shown in FIG. 4, according to the present invention, is based on the multi-slit projector shown in FIG. 3, but an improvement in the pixel resolution is attained by making the multi-slit lights movable.

The multi-slit projector according to the invention comprises a light source 41 for emitting parallel lights, first and second diffraction gratings 42 and 43 for receiving the parallel lights from the light source 41 and for diffracting the parallel lights in diffractive directions perpendicular to each other, a cylindrical lens 44 on which output lights diffracted by the first and second diffraction gratings 42 and 43 are incident and which produces a plurality of parallel slit lights dispersed in the diffractive direction of either one of the first and second diffraction gratings 42 and 43, and a shutter array for obstructing predetermined slit lights among the parallel slit lights from the cylindrical lens 44, to thereby form a code therefrom. According to the present invention, there is further provided an actuator 46 for displacing a configuration including at least one of the first and second diffraction gratings 42 and 43 by only a minute distance in the direction perpendicular to the parallel slit lights.

Parallel lights emitted from the light source 41 are modified into oval spot lights 47 through the first diffraction grating 42, and are further modified into spot lights 48 in a matrix arrangement. Subsequently, the cylindrical lens 44 produces parallel slit lights arranged in the direction perpendicular to the longitudinal direction of the cylindrical lens 44 and having a pitch 10, which impinges on the shutter array 5 by which the parallel slit lights are formed into a code by a selective use of the shutters.

When the actuator 46 causes the first and the second diffraction gratings 42 and 43, the cylindrical lens 44, and the shutter array 45 to be displaced in the X-axis direction perpendicular to the slit lights extending along Y-axis, by, for example, half the pitch P of the slit lights, the parallel slit lights 49 are the same as when slit lights having a pitch equal to half of the pitch P are irradiated, thereby improving the pixel resolution. Similarly, when the displacement is effected by a ⅓ pitch, and subsequently effected by a further ⅓ pitch, the parallel slit lights 49 are the same as when the slit lights have a ⅓ pitch of the pitch P. Namely, the pixel resolution can be improved by a simple structure.

Hereinafter, a description will be made of embodiments of the multi-slit projector of the present invention, with reference to FIG. 5 and the subsequent drawings.

Figure 5:
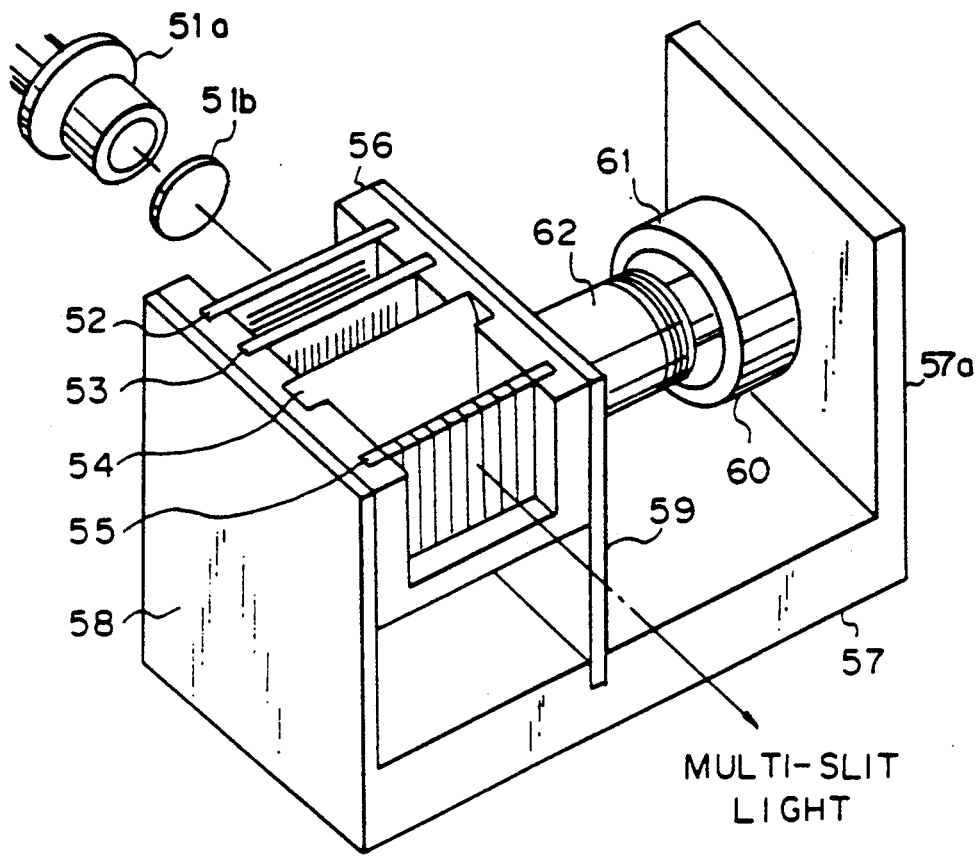
FIG. 5 is a perspective view of a projector according to an embodiment of the present invention.
Figure 6:
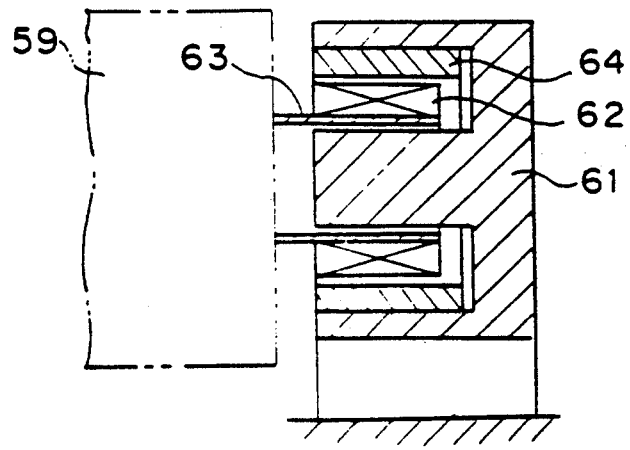
FIG. 6 is a sectional view of a projector showing the principal part of the embodiment of the present invention.

FIG. 5 is a perspective view of the multi-slit projector according to an embodiment of the present invention, in which a voice coil motor 60 is used as an actuator, and FIG. 6 is a sectional view of the principal part thereof. In the figures, reference numeral 51a denotes a semiconductor laser, 51b a collimating lens, 52 a first diffraction grating, 53 a second diffraction grating, 54 a cylindrical lens, 55 a shutter array, and 56 a support frame for supporting the first and second diffraction gratings 52 and 53, the cylindrical lens 54, and the shutter array 55. Reference numeral 57 represents a base plate, 57a is an upright portion thereof, 58 and 59 are support springs, 61 is an iron core, 62 is a coil, 63 is a support cylinder, and 64 designates a permanent field magnet.

A light having a single wavelength emitted from the semiconductor laser 51a is converted into a parallel beam by the collimating lens 51b and arrives at the first diffraction grating 52 which produces an output light consisting of oval spot lights arranged in a line. The output light falls on the second diffraction grating, which produces spot lights arranged in a matrix, and impinges on the cylindrical lens 54. In FIG. 5, the cylindrical lens 54 is in the shape of a half-cylinder, but also may have a fully cylindrical shape. The spot lights are arranged in the direction perpendicular to the longitudinal direction of the cylindrical lens 54, as chain-like slit lights respectively through the cylindrical lens 54, and arrive at the shutter array 55. When the shutter array 55 is completely opened, all of the slit lights are output in the form of a multi-slit light. Further, when the multi-slit light is irradiated a plurality of times, it can be coded by closing the shutters at selected locations.

As the shutter array 55, for example, a liquid crystal shutter array utilizing a polarized light, and a shutter array having electro-optic effect elements between the polarizing plates can be used. In these cases, electrodes can be selected to apply voltage, to thereby control the opening and closing of the selected shutter.

Also, in the voice coil motor 60 acting as the actuator, the iron core 61 is fixed to the upright portion 57a of the base plate 57, and facing the permanent field magnet 64 fastened to the iron core 61 is the coil 62 secured to the support cylinder 63, which in turn is connected to the support spring 59. The bottom ends of the support springs 58 and 59 respectively are fixed to the base plate 57, and at the top ends thereof, there is mounted a support frame to which is fixed the first and second diffraction gratings 52 and 53, the cylindrical lens 54, and the shutter array 55.

Consequently, when the coil 62 is supplied with an electric current, the support cylinder 63 fixing the coil 62 is displaced by a magnetic attraction or repulsion produced between the coil 62 and the permanent field magnet 64, which causes the configuration including the first and the second diffraction gratings to shift by a minute distance with respect to the light source, against the support springs 58 and 59. In this case, since the multi-slit light is composed of longitudinal slit lights, a laterally microscopic displacement thereof occurs.

If the minute displacement is, for example, half a pitch P of the multi-slit light, the situation is the same as when the multi-slit light having a P/2 pitch is irradiated onto the object to be measured. It is also possible to displace same at a pitch of P/3 or P/4, and such a microscopic displacement can be accurately achieved without difficulty by a feedback control of the voice coil motor 60. Furthermore, a continuous displacement between the slit lights also can be used for the measurement of the object.

Moreover, there may be adopted configurations in which only the first diffraction grating 52 is supported by the support springs 58 and 59 so as to be displaceable while the second diffraction gratings 53, the cylindrical lens 54, and the shutter array 55 are fixed along with the light source, or in which only the second diffraction grating 53 is displaceably supported by the support springs 58 and 59 while fixing the first diffraction grating 52, the cylindrical lens 54, and the shutter array 55 together with the light source. Further, it is also acceptable to displaceably support only the first and the second diffraction gratings 52 and 53 by the support springs 58 and 59 with the other parts fixed together with the light source.

As described above, the configuration including at least one of the first and the second diffraction gratings is shifted by only a minute distance, so that positional slippage between the multi-slit light and the shutter array 55 should be taken into consideration when the shutter array 55 is fixed.

Further, the first and second gratings can be formed of an optical fiber array. For example, in FIG. 4, the first diffraction grating 42 consists of a plurality of optical fibers extending along the X-axis and arranged in the Y-axis direction, whereas the second diffraction grating 43 includes a Y-axis extending optical fibers arranged in the X-axis direction.

In the slit lights produced by such diffraction gratings, adjacent slit lights have an irradiation angle $\Delta\theta$ established by the following expression;

$$\Delta\theta = \theta_m - \theta_{m-1}$$
$$= \sin^{-1}\frac{m\lambda}{d} - \sin^{-1}\frac{(m-1)\lambda}{d}$$

where $\lambda$ is a wavelength of the light emitted from the semiconductor laser 51a, "d" is a diameter of the optical fiber farming the first and second diffraction gratings 12 and 13, $\theta_m$ is an angle between the slit lights respectively having a diffraction mode 0 (a slit light emitted on the optical axis) and having a diffraction mode "m" (an "m"th slit light from the optical axis), and $\theta_{m-1}$ represents an angle between the slit lights of mode 0 and mode "m−1".

In addition, the interval $W_m$ between slit lights projected on the object spaced by a distance L is given by the following expression.

$$W_m = L(\tan\theta_m - \tan\theta_{m-1})$$
$$= L(\tan\left(\sin^{-1}\frac{m\lambda}{d}\right) -$$
$$\tan\left(\sin^{-1}\frac{(m-1)\lambda}{d}\right)$$

Since the diameter "d" of the optical fiber is usually 20 to 100 μm, the distance by which the support springs 58 and 59 are displaced by the voice coil motor 60 may be 20 to 100 μm or less.

Further, even between the slit lights of the multi-slit light which is projected on the object to be measured, slit lights can be projected by displacing at least one of the first and second diffraction gratings 52 and 53 by a microscopic distance, thereby improving the pixel resolution.

Figure 7:
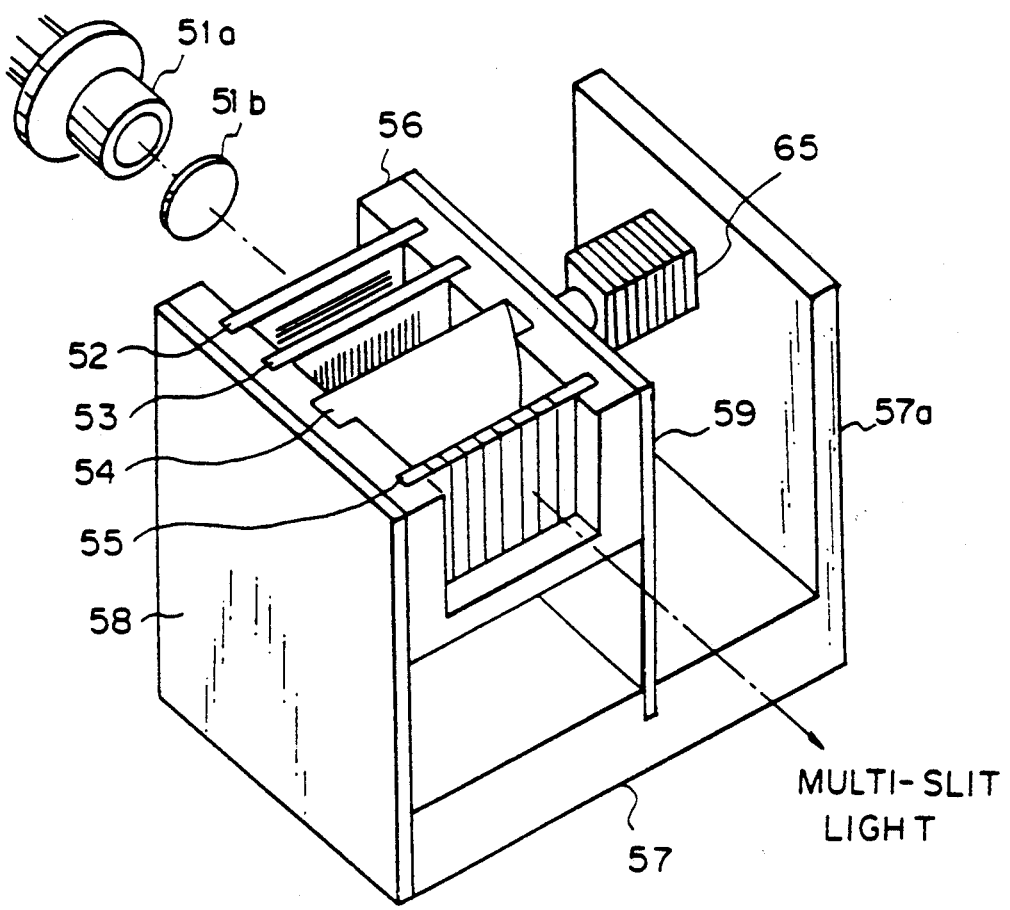
FIG. 7 is a perspective view of a projector according to another embodiment of the present invention.

FIG. 7 is a perspective view of a multi-slit projector according to another embodiment of the present invention, in which a piezoelectric element 65 is used as the actuator. In FIG. 5 and in FIG. 7, the same elements are designated by the same reference numerals. As for the piezoelectric element 65 in this embodiment, providing a desired displacement is not obtained by a single piezoelectric element. A plurality of piezoelectric elements may be stacked to cause a displacement on the order of 20 to 100 μm, without difficulty. In this embodiment also, an accurate microscopic displacement can be ensured under a feedback control.

In the same manner as the above-described embodiment, a configuration including at least one of the first and second diffraction gratings 52 and 53 can be displaced by only a minute distance, by the support springs 58 and 59 through the support frame 56.

Figure 8:
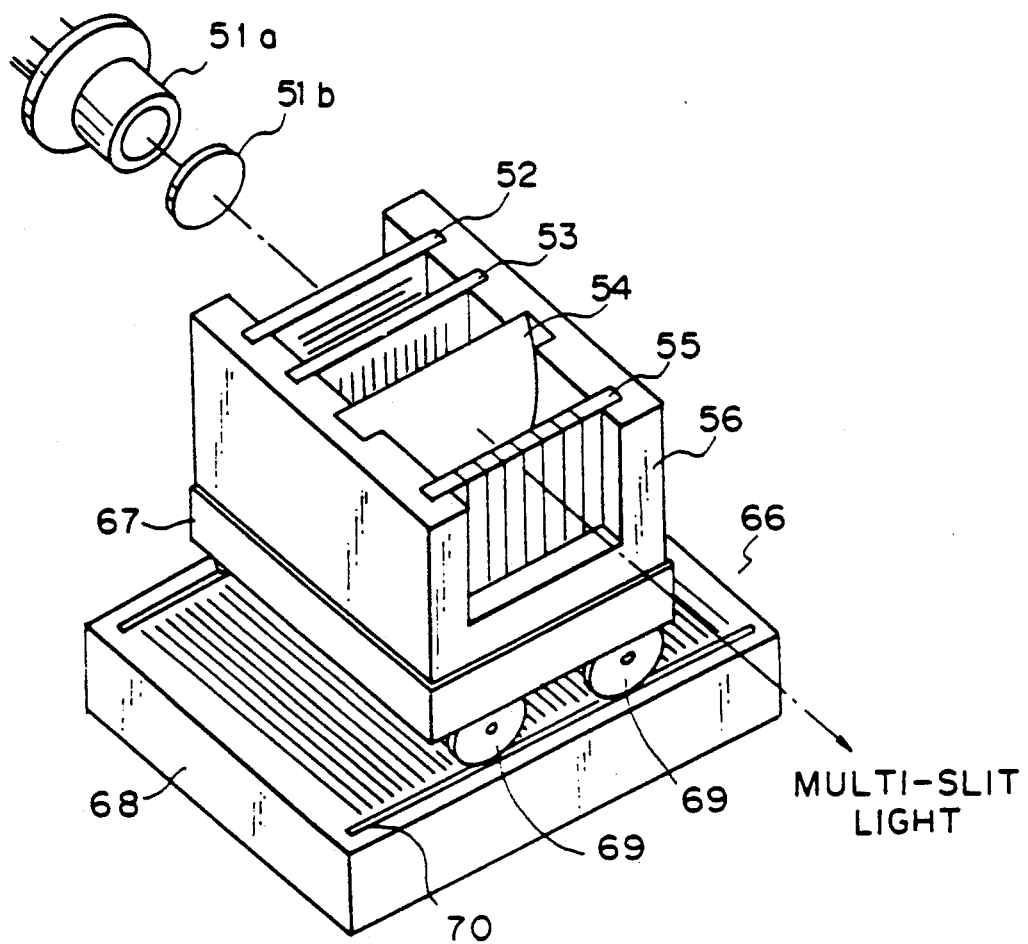
FIG. 8 is a perspective view of a projector according to still another embodiment of the present invention.

FIG. 8 is a perspective view of a multi-slit projector according to a further embodiment of the present invention, in which a linear motor 66 is used as the actuator. In FIG. 5 and in FIG. 8, the same elements are labelled with the same reference numerals.

The linear motor 66 in accordance with this embodiment comprises a moving element 67 to which the support frame 56 is fixed, a stator 68, wheels 69 and guide rails 70 which guide the moving element 67. For example, a coil is mounted on either the moving element 67 or the stator 68, and a permanent magnet is mounted on the other. Thus, when the coil is energized, the moving element 67 is guided by the wheels 69 and the guide rails 70 to be shifted by a minute distance. In this embodiment also, a desired amount of minute displacement can be accurately achieved by position sensing and a feedback control.

Further, in this embodiment also, the configuration including at least one of the first and second diffraction gratings 52 and 53 is fixed to the support frame 56 so as to allow a minute displacement by the moving element 67.

The present invention is not restricted to the above described embodiments. For example, as the actuator for a minute displacement, various arrangements can be employed besides the voice coil motor 60, the piezoelectric element 65, or the linear motor 66.

As described hereinbefore, the multi-slit projector according to the present invention comprises the first and second diffraction gratings 42 and 43, the cylindrical lens 44, and the shutter array 45, in which parallel light from the light source 41 are made a multi-slit light, and a configuration including at least one of the first and second diffraction gratings 42 and 43 is displaced by only a minute distance with respect to the light source by the actuator 46, to allow the slit lights to be irradiated on spaces between the slit lights, and accordingly, can be controlled such that a situation identical to the situation in which the pitches between the slit lights can be even lessened or the space between the slit lights can be successively scanned, to thereby improve the pixel resolution and accomplish the miniaturization of the apparatus without difficulty.

Therefore, the present invention can be applied to the multi-slit projector for three-dimensional measurement which realizes a visual function and the like for a robot or other various automatic apparatuses. Further, an accuracy of the three-dimensional measurement for the object to be measured can be improved by simple structure.

Next, picked up image recognizing devices in the three-dimensional measuring apparatus according to various embodiments of the present invention are described.

In the conventional picked-up image recognizing device, as described before with reference to FIG. 9, after projecting all of the patterns A, B, and C, the image signals corresponding to the coded multi-slit light patterns are stored in the image memories respectively, and then are collated to decode the coded multi-slit light, i.e., to number the slit lights. Therefore, this has a disadvantage that many image memories must be provided.

In addition, the decoding of the coded multi-slit lights is carried out by collating data in the corresponding image memory after projecting all of the pattern. Therefore a drawback arises in that the processing time is prolonged and the number of patterns increased as a result of an increase of the number of multi-slit lights.

The image recognizing device in the three-dimensional measuring apparatus according to an embodiment of the present invention is intended to speed-up the processing and to reduce the memory capacity by the application of the image processing described with reference to FIG. 10.

Figure 10:
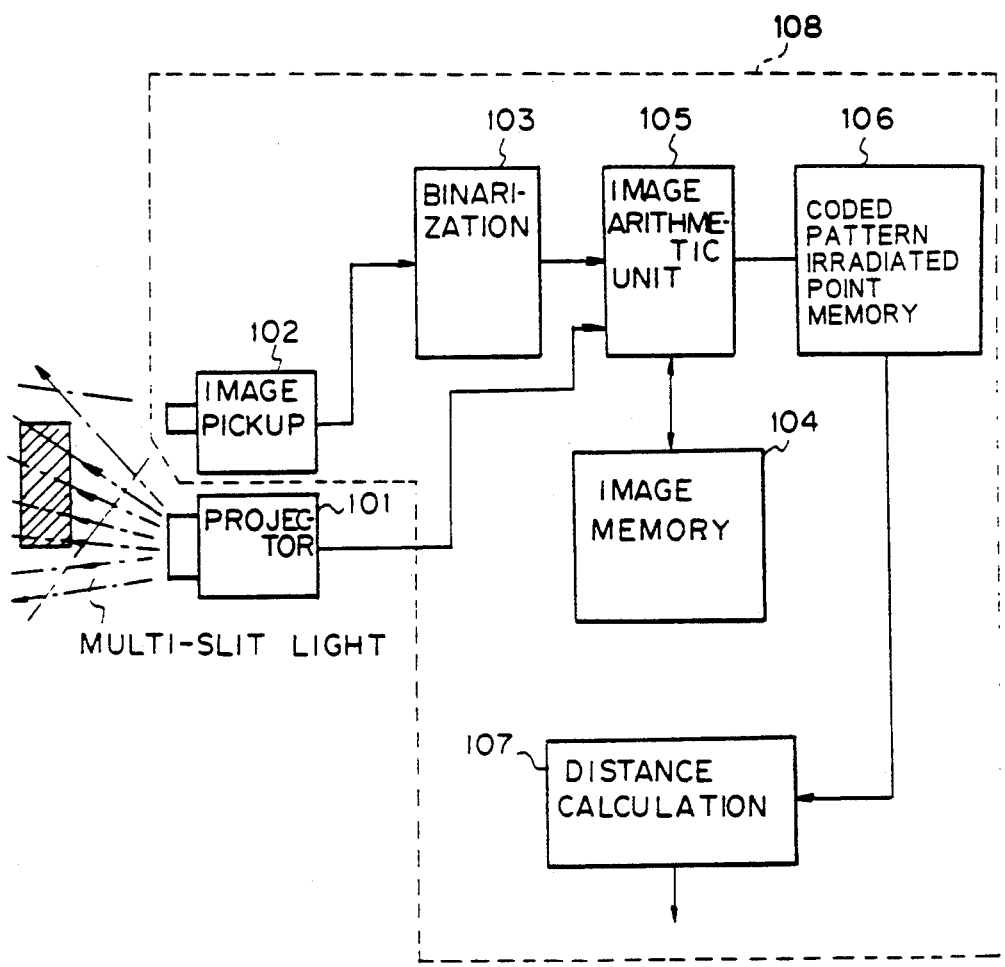
FIG. 10 is a diagram explaining the principle of the three-dimensional measuring apparatus according to the present invention.

The three-dimensional measuring apparatus in FIG. 10 comprises a multi-slit projector 101 for projecting a multi-slit light pattern under the control of a shutter array, and a picked-up image recognizing device 108. The picked-up image recognizing device 108 comprises an image pick up unit 102 for picking up the coded multi-slit light pattern projected on an object to be measured, a binarization circuit 3 for binarizing the image signals from the image pick up unit 102, and an image arithmetic unit 105 which changes a weight assigned to the binarized image signal. The binarized image signal is converted by the binarization circuit 103 each time the coded multi-slit light pattern is changed. The automatic unit 105 also sums up the last weighted binarized image signals or the image signals of the last addition results read out from the image memory 104 and the newly weighted binarized image signals. A coded pattern irradiated point memory 106 is provided for storing the coordinates for the coded pattern irradiated points of the object to be measured corresponding to the multi-slit light decoded by the final operating results of the image arithmetic unit 105, and a distance calculating unit 107 is provided for computing the three-dimensional position of the coded pattern irradiated points of the object to be measured, based on the coordinates for the coded pattern irradiated points stored in the coded pattern irradiated point memory 106.

Further, the multi-slit projector 101 and the image pick up unit 102 are arranged on a surface which crosses each of the multi-slit lights at a right angle, and are arranged to have the same X axis extending parallel to the direction of the array of the multi-slit lights. The distance calculating unit 107 is constructed by a read-only memory (ROM) which can read out the data of the three-dimensional position by the use of the coordinates of the coded pattern irradiated points stored in the coded pattern irradiated point memory 106 as the addresses.

The multi-slit projector 101 comprises, as described with reference to FIG. 3 or FIG. 4, a semiconductor laser, first and second diffraction gratings, a cylindrical lens, and a shutter array which projects a coded multi-slit light pattern.

The image pick up unit 102 is a television camera which picks up an image of an object to be measured, which is subjected to a multi-slit light. The image signals are binarized by the binarization circuit 103. Note, alternatively, after storing the image signals in the image memory 104, they may be binarized by the binarization circuit 103.

The image calculating unit 105 changes a weight assigned to a binarized image signal each time the coded multi-slit light pattern is changed, and sums up the last weighted binarized image signal and newly weighted binarized image signal, or sums up the content in the image memory 104 storing the last addition results and newly weighted binarized image signal. That is, the first binarized image signal in the coded multi-slit light pattern is assigned a weight $2^0$ and is stored in the image memory 104, and the second binarized image signal is assigned a weight $2^1$. The first and the second binarized image signals with the weights are then added and stored in the image memory 104. A weight $2^2$ is assigned to a third binarized image signal. The third binarized signal with the weight $2^2$ and the previously added result are added and stored in the image memory 104.

In the same manner hereafter, for the multi-slit light consisting of "n" slit lights, "n" kinds of coded multi-slit light patterns are successively projected, and the i-th binarized image signal is assigned a weight $2^{i-1}$, and the weight image signal is added to the previously added result. Thus, when the multi-slit light patterns are projected "n" times, and the final addition result is obtained, decoded slit-lights can be obtained. Note, instead of the weighting in the image arithmetic unit 105, a weighting for the binarized image signals may be performed in the binarization circuit 3.

In correspondence with the slit lights thus decoded, the coordinates of the coded pattern irradiated points of the object to be measured determined by projecting the multi-slit light are stored in the coded pattern irradiated point memory 106. Based on the coordinates of the coded pattern irradiated points, the three-dimensional position is determined by the distance calculating unit 107. That is, the coordinate position of the coded pattern irradiated points are calculated by triangulation.

Also, by arranging the multi-slit projector 101 and the image pick up unit 102 on a surface which crosses each of the multi-slit lights at a right angle, and by arranging them to have the same X axis extending parallel to the direction of the array of the multi-slit lights, it becomes possible to previously determine the coefficients in the distance calculation. This makes it possible to use the read-only memory (ROM) to read out the three-dimensional position of the object to be measured from the coordinates stored in the coded pattern irradiated memory 106.

Figure 11:
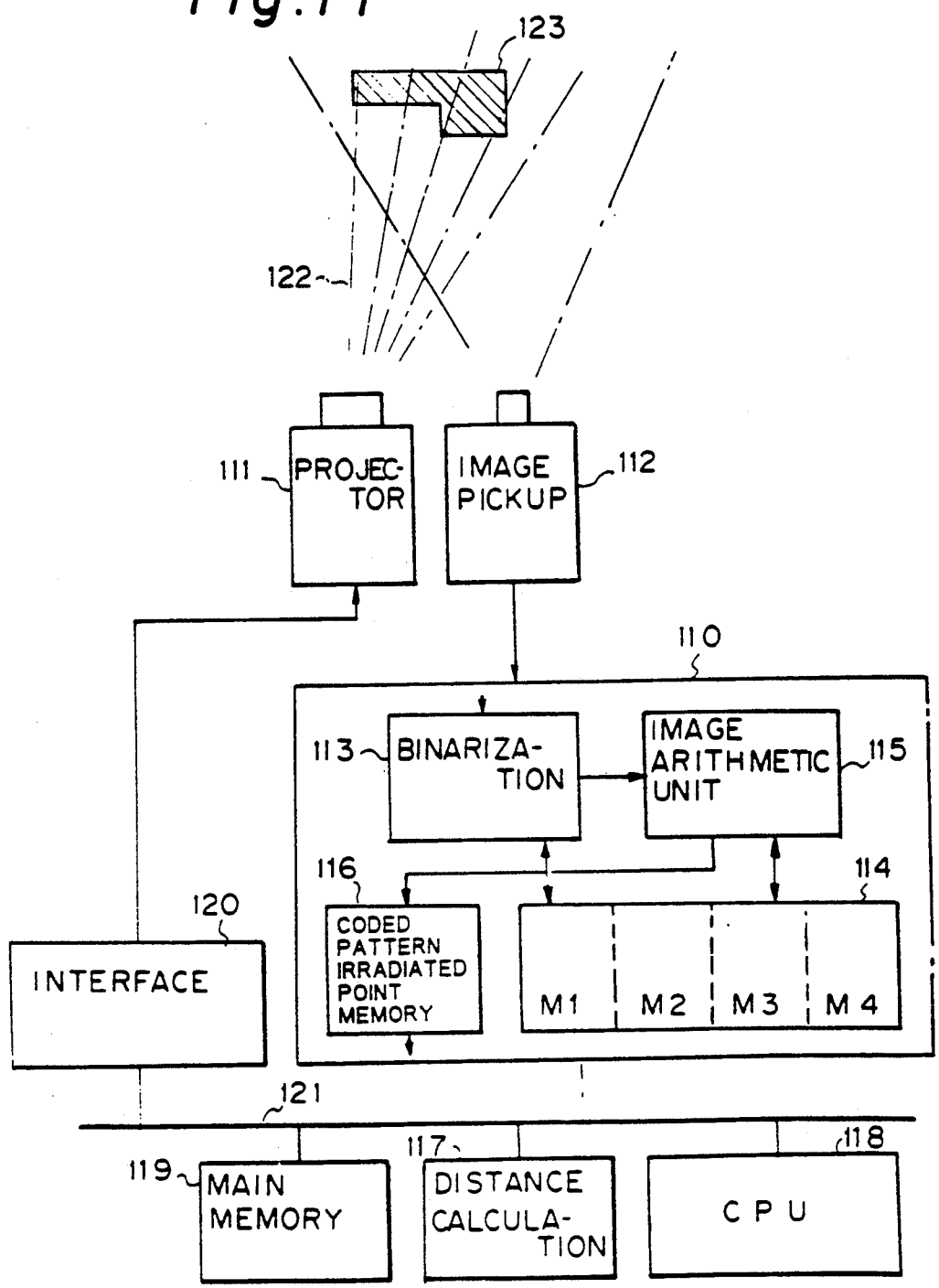
FIG. 11 is a block diagram of a three-dimensional measuring apparatus according to an embodiment of the present invention.

FIG. 11 is a block diagram showing the embodiment of FIG. 10 in more detail.

In FIG. 11, a reference numeral 110 denotes an image processor, 111 a multi-slit projector, 112 an image pickup unit, 113 a binarization circuit, 114 an image memory including regions M1 to M4 each having a capacity one screen of, for example, 8 bits for each pixel, 115 an image arithmetic unit, 116 a coded pattern irradiated point memory, 117 a distance calculating unit, 118 a processor (CPU) for controlling each unit, 119 a main memory, 120 an interface unit, 121 a common bus, 122 a multi-slit light, and 123 an object to be measured.

The multi-slit projector 111 is the same as that shown in FIG. 4 or FIG. 5. The image pick up unit 112 picks up the multi-slit lights 122 projected onto the object 123 to be measured, and the pick up image signal is binarized by the binarization circuit 113, and then applied to the image arithmetic unit 115 or the image memory 114. Alternatively, the pick up image signal may be stored in the image memory 114, and then binarized by the binarization circuit 113.

The image processor 110 includes the binarization circuit 113, the image memory 114, the image arithmetic unit 115, and a coded pattern irradiated point memory 116. The binarized image signal is weighted by the binarization circuit 113 or the image arithmetic unit 115, and control data for projecting a coded multi-slit light pattern from the multi-slit projector 111 are transferred from the processor 118 to the image processor 110. The weighting is controlled based on the transferred control data.

Figure 12:
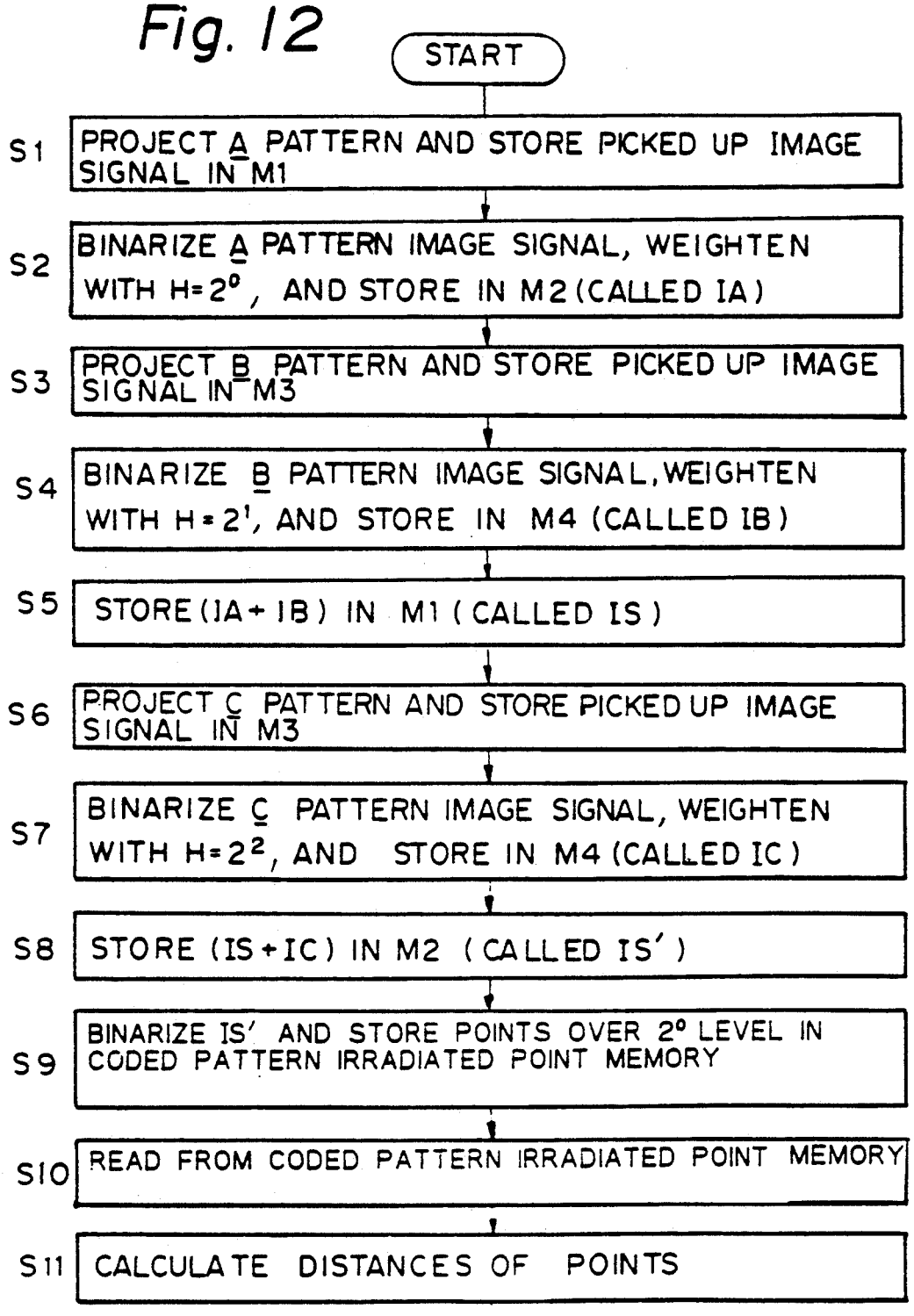
FIG. 12 is a flowchart explaining the operation of the apparatus shown in FIG. 12.
Figure 13:
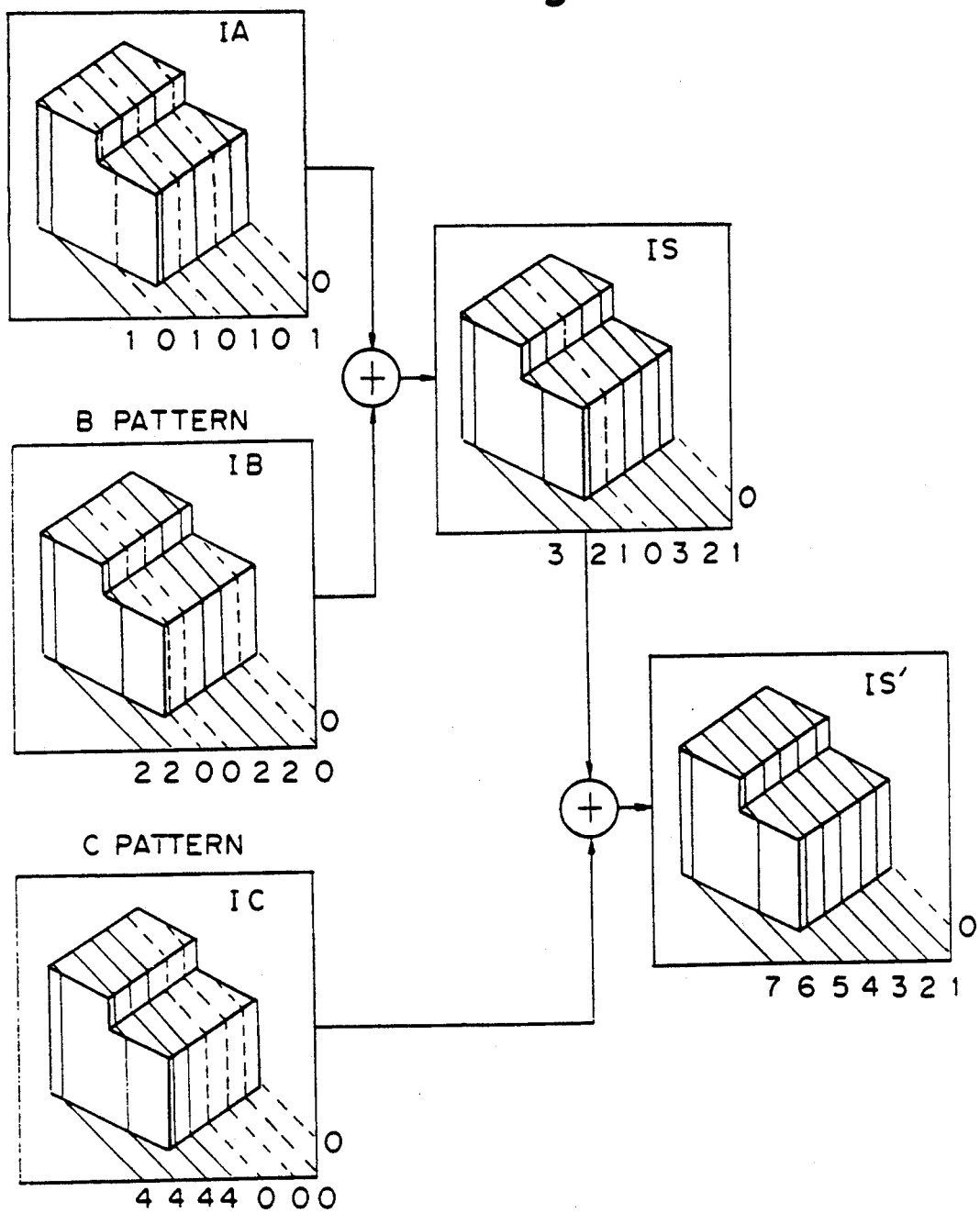
FIG. 13 is a diagram for explaining the operation of the apparatus shown in FIG. 11.

FIG. 12 is a flowchart explaining the operation of the three-dimensional measuring apparatus shown in FIG. 11, which is composed of steps S1 to S11. Further, FIG. 13 is a diagram also explaining the operation of the apparatus shown in FIG. 11. In this embodiment, a multi-slit consisting of eight slit lights is projected. More slit lights are, of course, applicable if required.

Referring to FIGS. 11 to 13, first, from the multi-slit projector 111, a pattern A is projected onto the object 123 to be measured, and the image signal picked up by the image pick up unit 112 is stored in the memory region M1 in the image memory 114 (S1). This pattern A is composed of alternate slit lights (shown by the solid line), in which the broken line designates light obstructed by the shutter array. The slit lights are picked up through the image pick up unit from an angle which is different from the angle at which the multi-slit light is projected, and thus they can be picked up in a bent or curved state corresponding to the configuration of the object 123 to be measured. For example, if each slit light is picked up in the form of a line, it is proved to be a plane.

Next, the image signal of the pattern A stored in the memory region M1 is binarized by the binarization circuit 113, and weighted and stored in the memory region M2, which is designated as an image signal IA (S2). In this case, the weight is assigned to be 0 for the low-level "0", and is assigned to be $2^0=1$ (H=$2^0$) for the high-level "1". Therefore, as shown in the pattern A in FIG. 13, the image signal IA consisting of a multi-slit light represented by a code "10101010" is obtained.

Subsequently, a pattern B is projected, and the pick up image signal is stored in the memory region M3 (S3). This pattern B is composed of slit lights arranged in alternate pairs of slit light pattern.

The image signal stored in the memory region M3 is binarized by the binarization circuit 113, and the weighting is performed by the binarization circuit 113 or the image arithmetic unit 115. The binarized image signal having the high level "1" is weighted by 2=2 (H=$2^1$), stored in the memory region M4, and designated as an image signal IB (S4). Accordingly, as shown in the pattern B in FIG. 13, an image signal IB consisting of a multi-slit represented by a code "22002200" is provided.

The image signal IA stored in the memory region M2 and the image signal IB stored in the memory region M4 are each read out, both are summed by the image arithmetic unit 115, and the result is stored in the memory region Ml, which is designated as an image signal IS (S5). Consequently, as shown in FIG. 13, the image signal IS is formed of the multi-slit light represented by a code "32103210".

Then, a pattern C is projected, and the pick up image signal is stored in the memory region M3 (S6). This pattern C is composed of slit lights arranged on alternate adjacent four slit light patterns.

The image signal stored in the memory region M3 is binarized by the binarization circuit 13 and a weight of $2^2=4$ is assigned to the high level "1" (H=$2^2$) of the binarized image signal. The weighted signal is then stored in the memory region M4 and designated as an image signal IC (S7). As a result, as shown in the pattern C in FIG. 13, the image signal IC composed of a multi-slit light represented by a code "44 440000" is obtained.

Next, the image signal IS stored in the memory region M1 and the image signal IC stored in the memory region M4 are summed up with the aid of the image arithmetic unit 115, and the added result is stored in the memory region M2. The stored result is designated as an image signal IS' (S8). In consequence, as shown in FIG. 13, as a result of the addition, the image signal IS' consisting of a multi-slit light represented by a code "76543210" is obtained, and thus the coded multi-slit light is decoded. In this case, the coding is based on the natural binary number, but other codes such as a Gray code are also applicable.

The image signal IS' stored in the memory region M2 and showing the decoded result is represented by the multi-number, and thus it must be binarized to store the coordinate points having a level higher than 2 to the coded pattern irradiated point memory 16 (S9). Then, the content of the coded pattern irradiated point memory 116 is read out (S10), and a distance between coordinate points is calculated by the distance calculating unit 117 (S11). In this case, the distance calculation is executed by the special purpose distance calculating unit 117, but the operation function of the processor 118 may be utilized instead. Where various parameters and the like are predetermined, it is also possible to use a read only memory (ROM) as the distance calculating unit 117.

Figure 14:
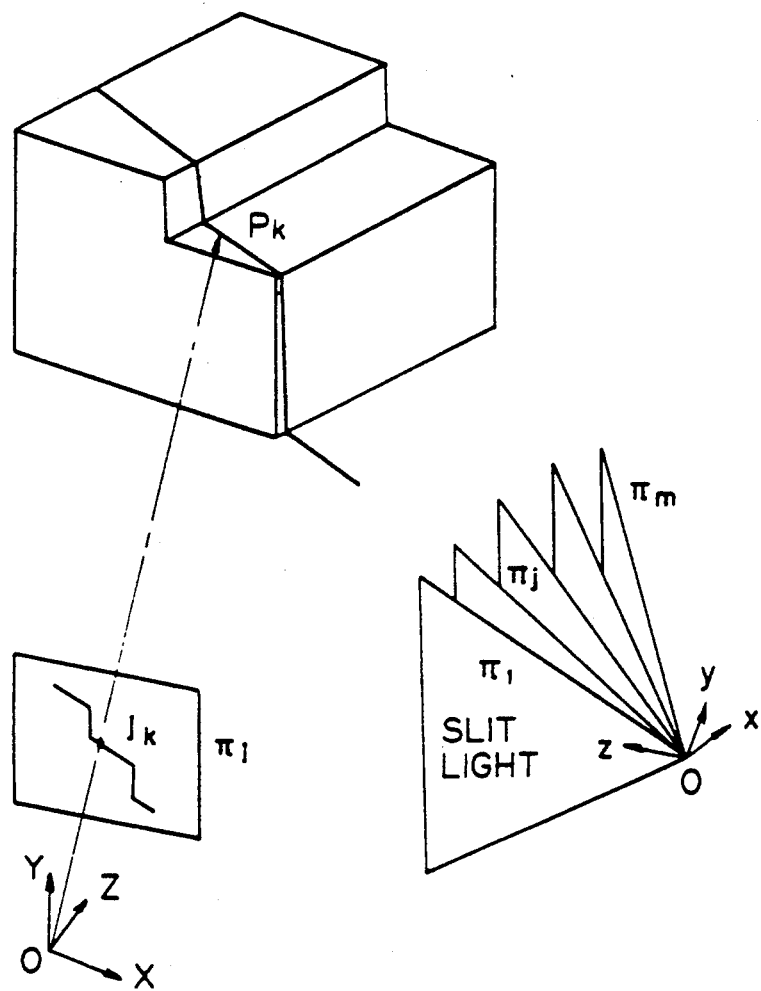
FIG. 14 is a diagram for explaining the distance measurement in the apparatus shown in FIG. 11.

The outline of the distance measurement will be described with reference to FIG. 14.

Assuming that a camera coordinate system whose origin is located at the center of a lens of the image pick up unit 12 is O-XYZ, and a light source coordinate system whose origin is at the center of a light source of the multi-slit projector is o-xyz, then the relationship between the two is expressed by $$\begin{pmatrix} x \\ y \\ z \end{pmatrix} = \begin{pmatrix} t_{11}, t_{12}, t_{13} \\ t_{21}, t_{22}, t_{23} \\ t_{31}, t_{32}, t_{33} \end{pmatrix} \begin{pmatrix} X \\ Y \\ Z \end{pmatrix} + \begin{pmatrix} t_{14} \\ t_{24} \\ t_{34} \end{pmatrix} \qquad (1)$$

where $t_{ij}$ (i=1 to 3, j=1 to 4) is a constant determined by the arrangement between the multi-slit projector 111 and the image pick up unit 112, which can be determined by calculation.

The multi-slit projector emits "m" slit lights dispersed around the y-axis, where the respective slit light planes $\pi_j$ are designated as (j=1 to m). The "j"th slit light produces a projection image P on the object to be measured while its pick up image I is formed on the image surface $\pi_I$ of the image pick up device 112. At that time, based on the principle of triangulation, a three-dimensional position of a point $P_k (X_k, Y_k, Z_k)$ on the projection image can be calculated as follows, as an intersection point between a line of sight $OI_k$ connecting the lens center O and a point $I_k (x_k, y_k)$ on the image plane, and the slit light plane $\pi_j$.

$$\begin{aligned} X_k &= u x_k \\ Y_k &= u y_k \\ Z_k &= u f \end{aligned} \quad (2)\;(3)$$

$$u = h/g$$

$$g = (t_{11}x_k + t_{12}y_k + t_{13}f)\cos\theta_j - \qquad (4)$$
$$\quad (t_{31}x_k + t_{32}y_k + t_{33}f)\sin\theta_j$$

$$h = t_{34} \sin\theta_j - t_{14} \cos\theta_j \qquad (5)$$

where $(x_k, y_k)$ signifies the position of $P_k$ on the image plane, $\theta_j$ represents a projection angle of the slit light plane, and "f" is a focal distance.

The coordinates $(x_k, y_k)$ can be determined as the coordinates stored in the coded pattern irradiated point memory 116, and $\theta_j$ can be determined from the decoded slit light No. j. That is, the value of "j" can be obtained as a gray level stored in the coded pattern irradiated point memory 116. 4

Figure 15:
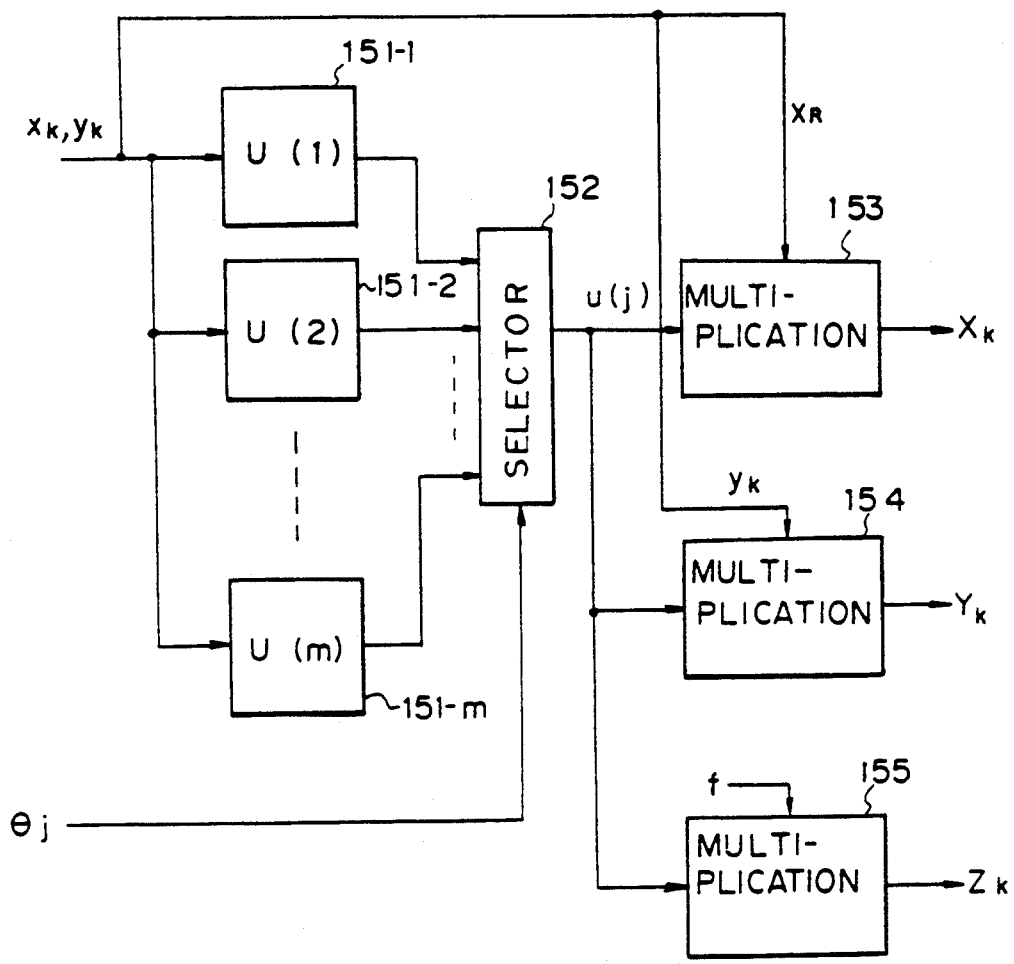
FIG. 15 is a block diagram showing a three-dimensional apparatus according to another embodiment of the present invention.

FIG. 15 is a block diagram of a principal part of the distance calculating unit 117, in which the coordinates $x_k$ and $y_k$ read out from the coded pattern irradiated point memory 116, and the focal distance f, are input, and values u(1) to u(m) according to the above expression (3) are calculated by calculating units 151-1 to 151-m corresponding to slit light numbers (1) to (m). Then, in accordance with the slit light number j, u(j) corresponding to one of the slit light numbers (1) to (m) is applied to the multiplication portions 153 to 155 with the aid of a selector 152, which executes multiplication based on the expression (2), to determine the three-dimensional positions $X_k$, $Y_k$ and $Z_k$.

In this case, by arranging the multi-slit projector 111 and the image pick up unit 112 on a surface which crosses each of the multi-slit lights at a right angle, and by arranging them at the same X axis extending parallel to the direction of the array of the multi-slit lights, "u" in the expression (3) is expressed as follows.

$$u = \alpha/(\beta+\gamma) \qquad (6)$$

$$\alpha = t_{34} \sin\theta_j - t_{14} \cos\theta_j \qquad (7)$$

$$\beta = t_{11} \cos\theta_j + t_{13} \sin\theta_j \qquad (8)$$

$$\gamma = t_{13} \cos\theta_j - t_{11} \sin\theta_j \qquad (9)$$

The coefficients $t_{11}$ to $t_{14}$ and $t_{31}$ to $t_{34}$ can be determined in advance as described above. Further, although $\theta_j$ can have "m" kinds of values according to the slit light Nos. (1) to (m), it is possible to predetermine the coefficients corresponding to the value $\theta_j$. Therefore, u is a function of $x_k$ and $\theta_j$. As a result, the three-dimensional position of the object 123 to be measured can be obtained without delay by storing a value of "u" or values of $X_k$, $Y_k$, and $Z_k$ to the read-only memory (ROM).

FIG. 16 illustrates an example of the operation of pipeline processing by the measuring apparatus shown in FIG. 11. In FIG. 16, F1 to F8 denote frames of the image signals, respectively. In the frame F1, the pattern A is projected on the object 123 to be measured, and the image signals picked up by the image pick up unit 112 are stored in the memory region M1. Next in the frame F2, the image signals of the pattern A in the memory region M1 are binarized, and stored in the memory region M2 as the image signals IA, and the pattern B is projected onto the object 123 to be measured, and the image signals by the image pick up unit 112 are stored in the memory region M3.

In the next frame F3, the image signals of the pattern B in the memory region M3 are binarized, and stored in the memory region M4 as the image signals IB.

In the next frame F4, the contents in the memory regions M2 and M4 are added and stored in the memory region M1 as image signals IS.

Subsequently, in the frame F5, the pattern C is projected onto the object 123 to be measured, and the image signals by the image pick up unit are stored in the memory region M3. Next, in the frame F6, the image signals of the pattern C in the memory region M3 are binarized and stored in the memory region M4 as image signals IC.

Next, in the frame F7, the contents of the memory regions M1 and M4 are summed up and stored in the memory region M2 in the form of image signals IS', and thus the coded multi-slit light is decoded.

Finally, in the next frame F8, the image signals IS' in the memory region M2 are binarized, and stored in the coded pattern irradiated point memory 116.

The decoding in this embodiment requires seven frame periods in the case of eight slit lights. For more slit lights, however, it is possible to decode, for example, by nine frame periods in the case of 16 slit lights, and by 11 frame periods in the case of 32 slit lights. That is, the greater the number of slit light, the lower the increase in the number of additional frames.

Figure 17:
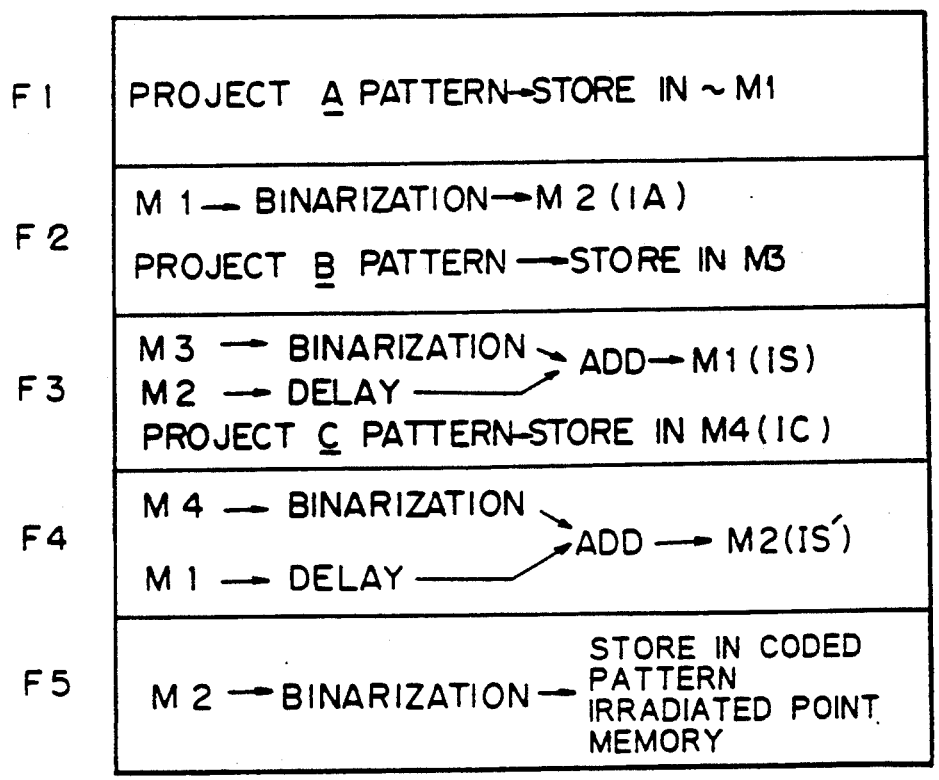
FIG. 17 is a diagram for explaining a pipeline processing according to still other embodiment of the present invention.

FIG. 17 is another example of the operation of a pipeline processing in the apparatus shown in FIG. 11. In this embodiment, in frame F1, the pattern A is projected, and the image signals from the image pick up unit 112 are stored in the memory region M1. Next, in the frame F2, image signals having the pattern A in the memory region M1 are binarized and stored in the memory region M2 as the image signals IA, and the pattern B is projected onto the object 123 to be measured. The and the image signals from the image pick up unit 112 are stored in the memory region M3. To this point, the procedures are the same as those in the embodiment shown in FIG. 16. In the next frame F3, however, the processes in the frames F3, F4, and F5 in FIG. 16 are simultaneously executed, i.e., the pattern C is projected onto the object 123 to be measured, the image signals picked up by the image pick up unit 112 are stored in the memory region M4, the pattern B image signals in the memory region M3 are binarized, and the image signals IA in the memory region M2 are read out, delayed corresponding to the binarization processing to perform the addition, and stored in the memory region M1 as the image signals IS.

Subsequently, in the frame F4, the processes in the frames F6 and F7 are simultaneously conducted, that is, the image signals of the pattern C in the memory region M4 are binarized, the image signals IS are read out, delayed corresponding to the binarization processing to perform the addition, and stored in the memory region M2 as the image signals IS'. Thus and thus the coded multi-slit light is decoded. In the next frame F5, similar to F8 in FIG. 16, the image signals IS' are binarized, and stored in the coded pattern irradiated point memory 116. Note, on the frame F5, a step for projecting the pattern A for the measurement of the next object to be measured may be initiated.

The image signals read out from the memory regions M2 and M1 in the above-mentioned frames F3 and F4 commonly provide address signals for the memory regions M1 to M4, which causes a delay in the binarization processing. It is also possible to delay the read-out addresses of the image signals IA and IS, to thereby perform the addition processing between the binarized image signals.

In this embodiment, the binarization of the image signals, addition processing between the images, and the projection of the coded multi-slit light may be simultaneously executed, whereby the decoding is accomplished by four frames in the case of eight slit lights as described earlier, by five frames in the case of sixteen slit lights, and by six frames in the case of thirty two slit lights. That is, even less time is required for decoding, compared to the embodiment shown in FIG. 16.

According to the embodiments of the present invention as described with reference to FIGS. 10 to 17, a coded multi-slit light is projected onto the object to be measured from the multi-slit projector, the image signals picked up by the image pick up unit are binarized through the binarization circuit. Each time the pattern of the coded multi-slit light is changed the weighting of the binarized image signal is altered. The last binarized image signals or image signals of the last addition results are summed up by the image operating unit, to decode the coded multi-slit light. Thus, even though the number of slit lights of the multi-slit light is large, the capacity of the image memory may be, for example, on the order of 4 screens, which results in miniaturization and cost saving. Moreover, an addition between the images may be executed through the image processor or the like, to thereby realize a high-speed decoding of the coded multi-slit light, thus leading to the speeding-up of the three-dimensional measurement processing.

Further, the multi-slit projector and the image pick up unit are arranged on a surface which crosses each of the multi-slit lights at a right angle, and are arranged to have the same X axis extending parallel to the direction of the array of the multi-slit lights. Thus, it is possible to predetermine the coefficients and the like in the distance computation, and thus the read-only memory can be used to read out the three-dimensional coordinates, to consequently simplify the structure and obtain a high-speed processing.

In the above described embodiments, as the coded multi-slit light patterns, "n" kinds of patterns are provided for $2^n$ multi-slit lights, to thereby number all of the slit lights. In that case, the image of the the object to be measured is obtained by the image pick up unit such as a television camera every time the "n" kinds of coded multi-slit light patterns are changed over for projection. The image signals for one screen having a plural-bit configuration for one pixel are stored in the image memories, the image signals each stored in the "n" image memories are readout, and the slit lights are numbered by an arithmetic process between the image signals for each slit light.

Therefore, in the above embodiments described with reference to FIGS. 10 to 17, the coded multi-slit light pattern is projected on the object to be measured, picked up image signals are converted into, for example, digital signals having an 8-bit configuration for one pixel to be stored to image memories, and the image signals are stored to different image memories at every change of the coded multi-slit light pattern. Accordingly, the use of a multiplicity of slit lights leads to an increase in the number of patterns, which requires a multiplicity of image memories, thus resulting in increased production costs. Further, based on the image signals stored in each image memory, the collating processing and the like are successively performed by a slit light, thereby increasing the number of slit lights, and thus prolonging the processing time.

Next, a three-dimensional measuring apparatus according to still further embodiments of the present invention will be described, in which the processing speed is further increased.

A three dimensional measuring apparatus according to another embodiment of the present invention is directed to speeding up the three-dimensional measurement by a parallel processing, the principle of which will be described with reference to FIG. 18.

Figure 18:
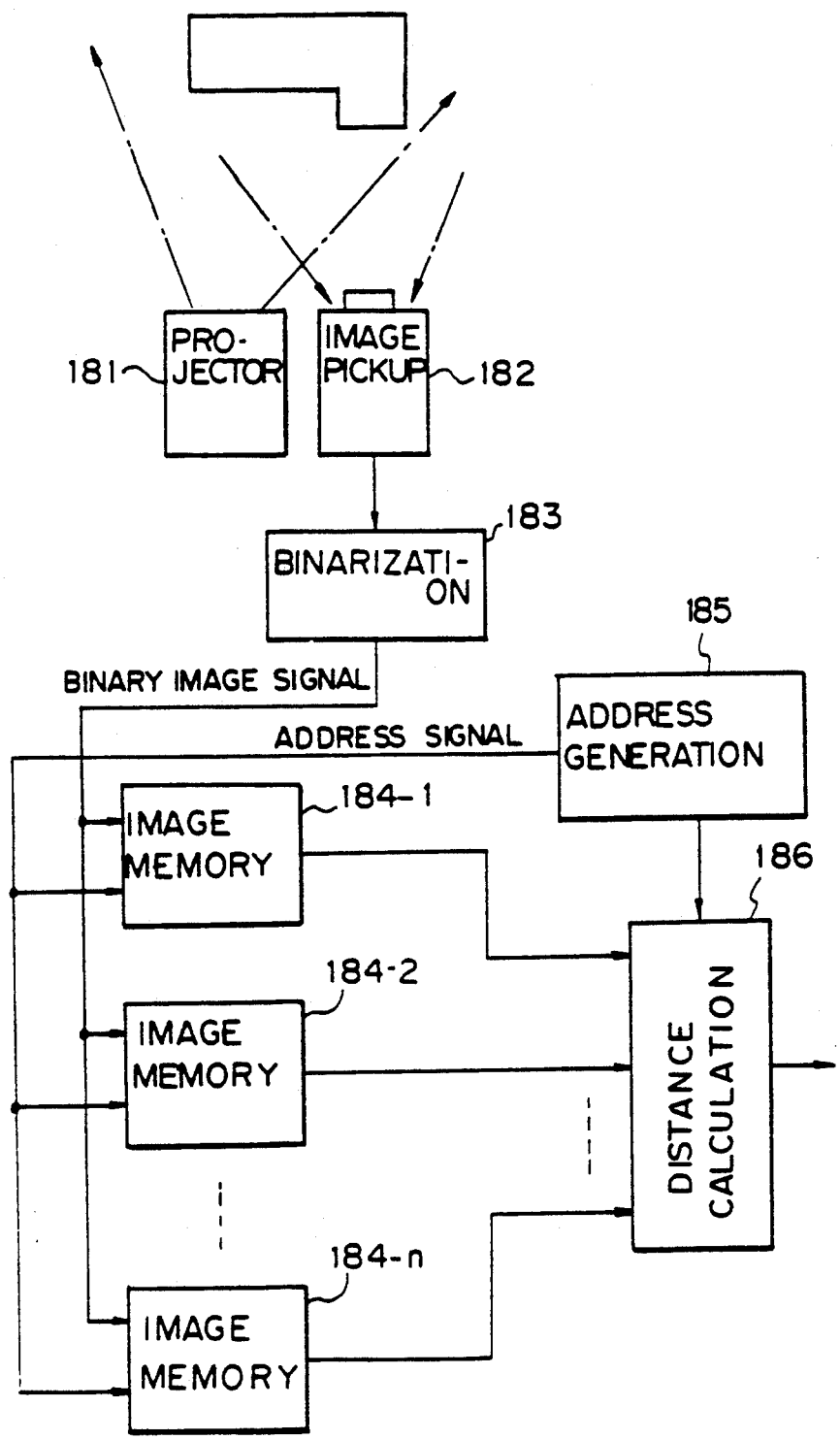
FIG. 18 is a block diagram of a three-dimensional measuring apparatus according to still further embodiment of the present invention.

In FIG. 18, the measuring apparatus according to a first aspect of the embodiment comprises a multi-slit projector 181 for projecting coded multi-slit light patterns onto an object to be measured, an image pick up unit 182 consisting of a television camera or the like and for obtaining an image of the coded multi-slit light patterns projected onto the object to be measured, a binarization circuit 183 for binarizing image signals from the image pick up unit 182, a plurality of image memories 184-1 to 184-n for storing binary image signals from the binarization circuit 183 so as to correspond with the coded multi-slit light patterns, an address generation circuit 185 for generating address signals for the plurality of image memories 184-1 to 184-n, and a distance calculation unit 186 which determines three dimensional positions of coded pattern irradiated points of the object to be measured, based on the address signals from the address generation circuit 185 and a slit light number having a bit configuration composed of the binary image signals simultaneously read-out from the plurality of image memories 184-1 to 184-n through the address signals.

The measuring apparatus according to a second aspect of the embodiment further comprises a decision control circuit which forms slit light numbers having a bit configuration excluding all "0"s from the bit configuration of the binary image signal simultaneously read out from the plurality of image memories 184-1 to 184-n, and only with respect to the slit light number, applies address signals from the address generation circuit 185 to the distance calculation unit 186.

According to a third aspect of the embodiment, the measuring apparatus comprises the multi-slit projector 181 for projecting coded multi-slit light patterns onto an object to be measured, the image pick up unit 182 including a plurality of light receiving elements and for picking up the coded multi-slit light patterns projected onto the object to be measured, the binarization circuit 183 corresponding to the light receiving elements and for binarizing each of outputs of the image pick up unit 182, shift registers corresponding to the light receiving elements and for shifting to store the output signals of the binarization circuit corresponding to the light receiving elements each time the coded multi-slit light patterns are changed over. The shift registers are serial-in /parallel-out type. An address generation circuit which produces address signals for specifying the shift registers corresponding to the light receiving elements, and a distance calculation unit determines a three-dimensional position of coded pattern irradiated points of the object to be measured based on the address signals from the address generation circuit and a slit light number having a bit configuration read-out in parallel from the shift registers corresponding to the light receiving elements specified by the address signals.

According to the first aspect of the embodiment, multi-slit light patterns are projected onto the object to be measured by the multi-slit projector 181. The image signals obtained by picking up the object to be measured through the image pick up unit 182 are binarized by the binarization circuit 183 and are stored in the image memories 184-1 to 184-n corresponding to coded multi-slit light patterns. That is, the binary image signals obtained by successively projecting "n" kinds of coded multi-slit light patterns are stored in "n" image memories 184-1 to 184-n.

Then, the binary image signals are simultaneously read out from the "n" image memories 184-1 to 184-n in compliance with the address signals from the address generation circuit 185. Accordingly, n-bit signals are obtained and assigned weights of $2^0$ to $2^{n-1}$, respectively, to be decoded and thus obtain slit light numbers. Based on the slit light numbers and the address signals, the distance from the observation point to the object to be measured can be calculated in the distance calculation unit 186, to thus obtain a three-dimensional position of the object to be measured.

According to the second aspect of the embodiment of the present invention, the binary image signals between slit lights of the coded multi-slit light pattern become "0", and when the binary image signals simultaneously read-out from the image memories 184-1 to 184-n are all "0", the address signals are not allowed to be used for the distance calculation. Therefore, this is determined in the decision control circuit, to prevent an input of useless address signals to the distance calculating unit 186.

According to a third aspect of the embodiment of the present invention, the image pick up unit 182 is formed of a plurality of light receiving elements arranged two-dimensionally, and the binarization circuit consisting of comparators and the like is provided, in which the binarized signals are input to the shift registers and shifted each time the coded multi-slit light patterns are changed. As a result, binary image signals for each coded multi-slit light pattern by one pixel are stored in each shift register. The address generation circuit generates address signals specifying the shift register by one picture element. The plurality of bits is read-out in parallel from the shift register specified by the address signals to be decoded and thus determine the slit light numbers. Based on the slit light numbers and the address signals, a three-dimensional position of the object to be measured can be obtained.

Hereinafter, the above-described aspects will be described in detail with reference in FIGS. 9, 14, 19, and 20.

Figure 19:
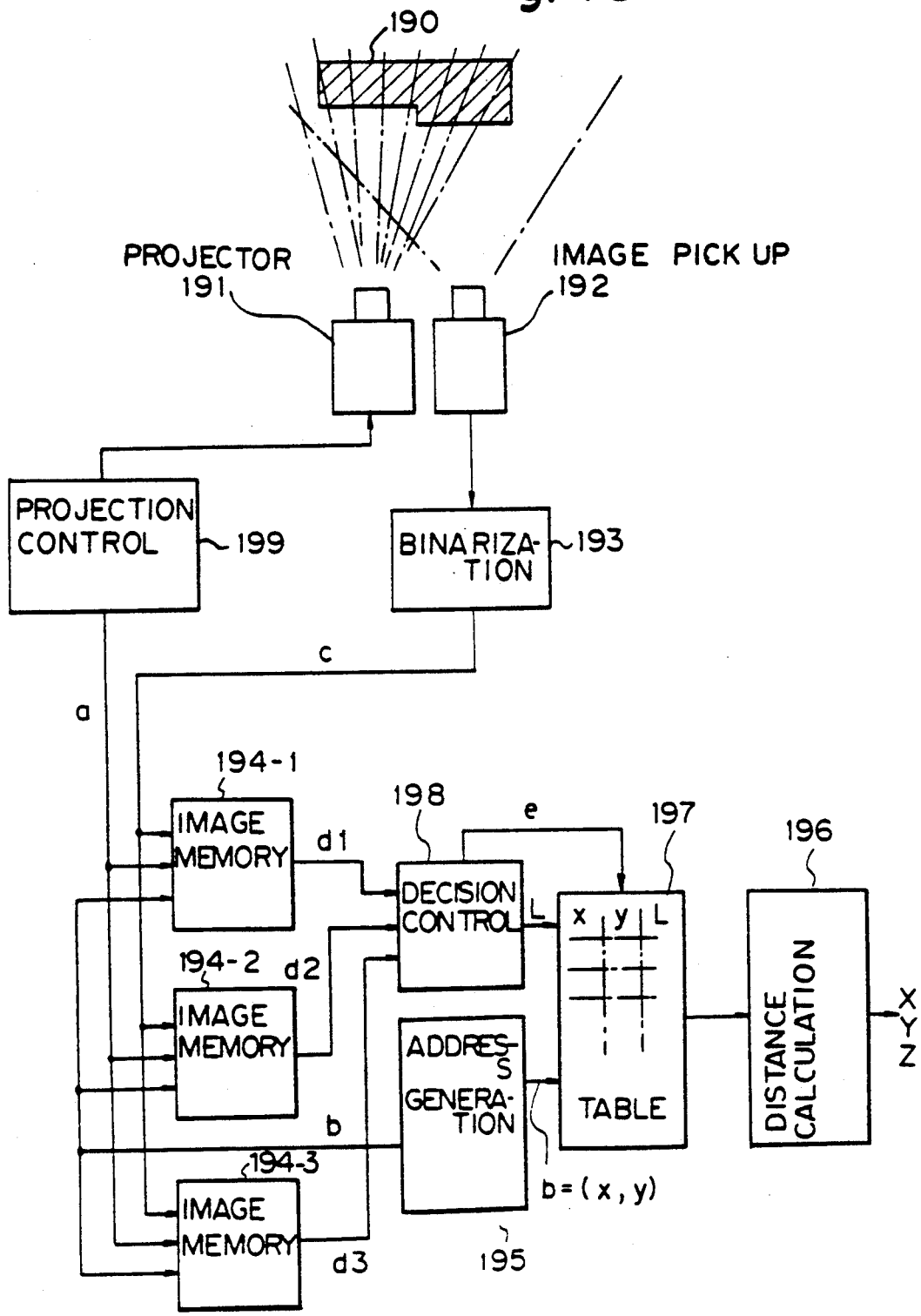
FIG. 19 is a detailed block diagram of the three-dimensional measuring apparatus shown in FIG. 18.

FIG. 19 is a block diagram of an embodiment of the present invention, in which reference numeral 190 denotes an object to be measured, 191 a multi-slit projector, 192 a television camera forming an image pick up unit, 193 a binarization circuit, 194-1 to 194-3 image memories corresponding to coded multi-slit light patterns, 195 an address generation circuit, 196 a distance calculation unit, 197 a table for storing effective data, 198 a decision control circuit, and 199 represents a projection control unit.

This embodiment shows a case where three kinds of coded multi-slit light patterns are sequentially projected onto an object to be measured through the multi-slit projector 191. The three image memories 194-1 to 194-3 are provided corresponding to coded multi-slit light patterns. Further, an image of the object 190, to be measured on which coded multi-slit light patterns are projected, is obtained by the television camera 192, the obtained image signals are binarized by the binarization circuit 193, and the binary image signals "c" are stored in the memory 194-1 to 194-3.

Switching signals "a" for the coded multi-slit light patterns derived from the projection control unit 199, and address signals "b" from the address generation circuit 195 are stored in the three image memories 194-1 to 194-3. The switching signals "a" specify the image memory 194-1 when the first coded multi-slit light pattern is projected, specify the image memory 194-2 when the second coded multi-slit light pattern is projected, and specify the image memory 194-3 when projecting the third coded multi-slit light pattern. Then binary image signals corresponding to pixels are stored in the addresses specified by the address signals "b".

When the coded multi-slit light patterns are changed for the projection, and the binary image signals "c" are stored in the image memories 194-1 to 194-3, a read-out is simultaneously carried out by using the address signals "b" from the address generation circuit 195. The read-out signals d1, d2, and d3 are applied to the decision control circuit 198. In this case, by decoding the three bits, for example, with $d1 \times 2^0 + d2 \times 2^1 + d3 \times 2^2$, a slit light number L for the coordinates x, y is obtained by the address signals "b".

As already described with reference to FIG. 9, which illustrates the coded multi-slit light patterns, when the three kinds of coded multi-slit light patterns A, B, C are changed over for the projection, a solid line signifies the presence of the multi-slit light and a broken line represents the absence of the multi-slit light. Assuming that the binary image signals obtained when the coded multi-slit light pattern A is projected are stored in the image memory 194-1, the binary image signals obtained when projecting the coded multi-slit light pattern B are stored in the image memory 194-2. The binary image signals obtained through the projection of the coded multi-slit light pattern C are stored in the image memory 194-3. Then, upon a simultaneous read-out from the same address in the three image memories 194-1 to 194-3, with d1, d2, d3=1, 0, 0, $1 \times 2^0 + 0 \times 2^1 + 0 \times 2^2 = 1$ is obtained as described above, which produces a slit light number "1". Further, in the case of d1, d2, d3=0, 1, 0, $0 \times 2^0 1 \times 2^1 + 0 \times 2^2 = 2$ is obtained, which produces a slit light number "2". In the same manner thereafter, by decoding the read-out signals d1 to d3 of three bit configuration, "0" through "7" slit numbers can be determined.

In addition, providing the coded multi-slit light are, for example, of six kinds of patterns, "0" through "63" are numbered for $2^6 = 64$ slit lights.

In the decision control circuit 198, the slit light number L can be determined by three bits of signals d1 to d3 simultaneously read out from the image memories 194-1 to 194-3 as described above, where the slit light number L and the concurrent address signal b=(x, y) are correspondingly written to the table 197, and are read out and applied to the distance calculating unit 196.

Also, the decision control circuit 198 is designed to write only address signals "b", by which slit light numbers can be determined, into the table 197 by writing signals "e", which makes a more effective use of the table 197. Namely, the binary image signals corresponding to pixels between a slit light and the next slit light are not subjected to the projection of slit lights even though the coded multi-slit light pattern is changed over, which produces all "0s". When all "0s" are discriminated, the address signal "b" can not be written into the table 197.

Similar to the embodiment described with reference to FIG. 14, the distance can be calculated as follows. In FIG. 14 again, O-XYZ signifies a coordinate system having the center of the lens of the television camera 192 as its origin, and o-xyz represents a light source coordinate system having the center of the light source of the multi-slit projector 191 as its origin. The relationship between the two is expressed as follows:

$$\begin{pmatrix} x \\ y \\ z \end{pmatrix} = \begin{pmatrix} t_{11}, t_{12}, t_{13} \\ t_{21}, t_{22}, t_{23} \\ t_{31}, t_{32}, t_{33} \end{pmatrix} \begin{pmatrix} X \\ Y \\ Z \end{pmatrix} + \begin{pmatrix} t_{14} \\ t_{24} \\ t_{34} \end{pmatrix} \quad (1)$$

where $t_{ij}$ (i=1 to 3, j=1 to 4) is a constant determined by the arrangement between the multi-slit projector 191 and the television camera 192, which can be determined by calculation.

The multi-slit projector emits "m" slit lights dispersed around the y-axis, where respective slit light planes are designated as $\pi_k$ (k=1 to m). Now notice the "j"th slit light $\pi_j$, which produces a projection image P on the object 190 to be measured, and a pick up image I thereof is formed on the image surface $\pi_I$ of the television camera 192. Note, for simplification of the drawing, FIG. 14 shows the case in which only one slit light 141 is irradiated on the object 190.

Based on the principle of triangulation, a three-dimensional position of a point $P_k$ ($X_k$, $Y_k$, $Z_k$) on the projection image can be calculated as follows, as an intersection point between a line of sight O-$I_k$ connecting the lens center O and a point $I_k$ ($x_k$, $y_k$) on the image plane $\pi_I$, and the slit light plane $\pi_j$.

$$\left. \begin{aligned} X_k &= u x_k \\ Y_k &= u y_k \\ Z_k &= u f \end{aligned} \right\} \begin{aligned} (2) \\ (3) \end{aligned}$$

$$u = h/g$$

$$g = (t_{11} x_k + t_{12} y_k + t_{13} f) \cos \theta_j - \quad (4)$$
$$(t_{31} x_k + t_{32} y_k + t_{33} f) \sin \theta_j$$

$$h = t_{34} \sin \theta_j - t_{14} \cos \theta_j \quad (5)$$

where ($x_k$, $y_k$) signifies the position of the $P_k$ on the image plane, $\theta_j$ represents a projection angle of the slit light plane, and "f" means a focal distance determined from the slit light number.

The position ($x_k$, $y_k$) of the point $I_k$ on the image plane $\pi_I$ corresponds to the addresses in the image memories 194-1 to 194-3. The projecting angle $\theta_j$ can be determined by the slit light number j. Accordingly, in the distance calculating unit 196, the three-dimensional position X, Y, Z of the coded pattern irradiated point of the object 190 to be measured can be determined by the address signals "b"=(x, y) read out from the table 197 and the slit light number L.

As described above, the slit light number can be determined by the 3-bit configuration of signals d1 to d3 read out in accordance with the address signals "b" from the image memories 194-1 to 194-3, so that the address signals and the slit light number L, which are both indispensable for the distance calculation, can be determined by sequentially changing over the predetermined kinds of coded multi-slit light patterns for the projection without the need to calculate the image signals. As a result, a high-speed three-dimensional measurement can be obtained. Although the number of the image memories 194-1 to 194-3 must be increased depending on the number of the coded multi-slit light patterns, the image memories store the binary image signals so that the capacity is not enormous. This facilitates the speeding-up of the processing of number the of slit lights necessary for the distance calculation.

Also, the table 197 and the decision control circuit 198 may be omitted. In this case, signals d1 to d3 are read out simultaneously from the image memories 194-1 to 194-3, and the address signals "b" are applied to the distance calculation unit 196 in which the slit light number is determined, to thereby perform the distance calculation for the three-dimensional position X, Y, Z of the coded pattern irradiated point for the object 190 to be measured.

Figure 20:
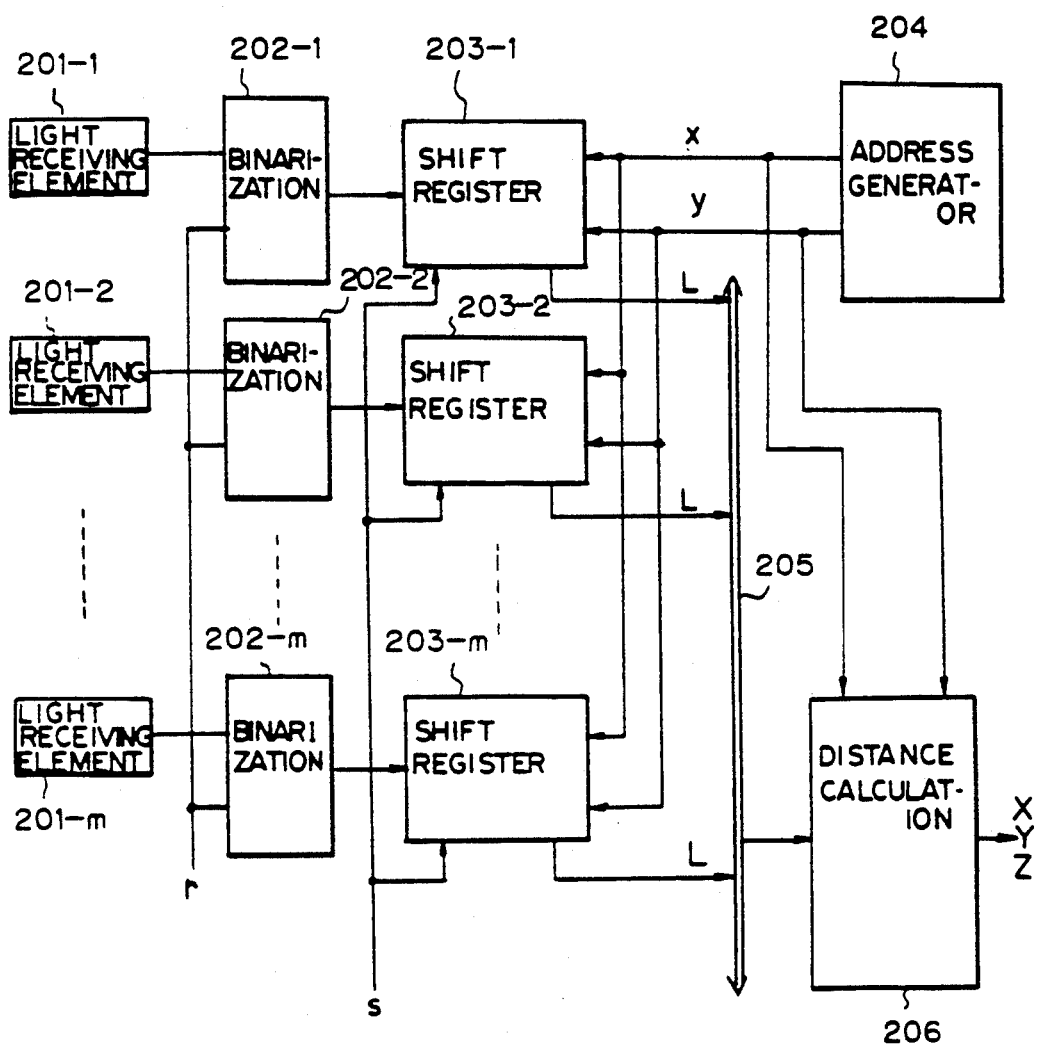
FIG. 20 is a block diagram of a three-dimensional measuring apparatus according to a still further embodiment of the present invention.

FIG. 20 is a block diagram of another embodiment of the present invention, in which reference numerals 201-1 through 201-m denote light receiving elements such as photo-diodes arranged two-dimensionally, 202-1 through 202-m signify binarization circuits corresponding to the light receiving elements, 203-1 through 203-m are serial-in / parallel-out shift registers corresponding to the light receiving elements, 204 is an address generator, 205 is a bus, and 206 is a distance calculation unit.

A multi-slit light pattern is projected onto an object to be measured (not shown in FIG. 20), the projection image is picked up by the image pick up unit composed of the light receiving elements 201-1 through 201-m, whose output signals are applied to the binarization circuits 202-1 through 202-m, respectively. These binarization circuits 202-1 through 202-m may be formed of a comparator which compares the signals from the light receiving elements 201-1 to 201-m with a reference voltage "r". The binary image signals from the binarization circuits 202-1 through 202-m are applied to the the shift registers 203-1 through 203-m, and then shifted by a shift signal "s".

The shift signal "s" is applied at the time of the change-over of the coded multi-slit light pattern. As mentioned above, in the case of three kinds of coded multi-slit light patterns, the shift registers 203-1 to 203-m may each comprise three stages. That is, the binary image signals for three screens can be stored by all of the shift registers 203-1 to 203-m.

Address signals x, y are applied to the shift registers 203-1 to 203-m and the distance calculation unit 36 from the address generation circuit 234. When the projection of the coded multi-slit light patterns is completed, one of the shift registers 203-1 to 203-m is specified by the address signals derived from the address generation circuit 204. The signals read out in parallel are applied to the distance calculation unit 206 through the bus 205.

Where the three-kinds of coded multi-slit light patterns are used as described before, three bits are read out in parallel from the shift register specified by the address signals x, y, with the result that the slit light number L can be determined in the same manner as with the three bits of d1 to d3 in the above described embodiments. By using the address signals x, y and the slit light number L, the three-dimensional position X, Y, Z of a coded pattern irradiated point of the object to be measured can be determined.

It is easy to render two-dimensionally arranged light receiving elements 201-1 to 201-m in an integrated circuit, and it is possible to include the binarization circuit 202-1 to 202-m in the form of the integrated circuit. Therefore, according to the embodiment shown in FIG. 20, the three-dimensional measuring apparatus as a whole can be mounted within a camera as a one body. Further, by the provision of the integrated circuit further including the shift registers 203-1 to 203-m, the number of light receiving elements 201-1 to 201-m is increased, to thus improve the resolution.

According to the embodiments shown in FIG. 19 and FIG. 20, coded multi-slit light patterns are projected onto the object to be measured, an image of which is obtained by the image pick up unit, binarized, and stored in the image memories corresponding to the coded multi-slit light patterns. The stored image data are read out simultaneously in accordance with the address signals. The read out signals having a plural-bit configuration are decoded to immediately determine the slit light number, and thus the slit light number and concurrent address signals can be used for the distance measurement. Without a particular increase of the capacity of the memories, a speeding up of the three-dimensional measurement can be accomplished.

Moreover, the image pick up unit is formed of the two-dimensionally arranged light receiving elements 201-1 to 201 -m, and the binarization circuits 202-1 to 202-m and the shift register 203-1 to 203-m are provided and correspond to the light receiving elements, in which the coded multi-slit light patterns are changed over so as to be projected onto the object to be measured. The binary image signals are stored in the shift registers, and are read out from the shift register specified by the address signals, to thus determine the slit light number. Consequently, a speeding-up of the three-dimensional measurement can be achieved, and it becomes possible to include the light receiving elements and the binarization circuits, and further to include the shift registers in the form of an integrated circuit, to thus obtain a miniaturized and cost-saving measuring apparatus.

We claim:

1. A three-dimensional measuring apparatus for measuring the distance from an observation point to a slit light irradiated point based on a triangulation by projecting multi-slit lights onto said object, composed of a multi-slit projector for projecting the multi-slit lights, said multi-slit projector comprising:
    a light source for emitting parallel light;
    first and second diffraction gratings for receiving said parallel light from said light source and for diffracting said parallel light in diffractive directions perpendicular to each other;
    a cylindrical lens on which output light diffracted by said first and second diffraction gratings are incident and which produces a plurality of parallel slit lights dispersed in the diffractive direction of either one of said first and second diffraction gratings;
    a shutter array for obstructing predetermined slit lights among the parallel slit lights from said cylindrical lens, to thereby form a code; and
    an actuator for displacing, in order to increase the resolution of the three-dimensional measurement, a configuration including a combination of at least one of said first and second diffraction gratings, said cylindrical lens and said shutter array by a minute distance in the direction perpendicular to said parallel slit lights.

2. A three-dimensional measuring apparatus as claimed in claim 1, wherein said actuator comprises means for displacing said configuration by a distance smaller than a pitch of said multi-slit lights.

3. A three-dimensional measuring apparatus as claimed in claim 1, wherein said actuator comprises means for displacing said configuration step by step.

4. A three-dimensional measuring apparatus as claimed in claim 1, wherein said actuator comprises means for continuously displacing said configuration.

5. A three-dimensional measuring apparatus as claimed in claim 1, wherein said actuator comprises:
a voice-coil motor; and
a supporting spring driven by said voice-coil motor, said supporting spring being associated with at least one of said first and second diffraction gratings.

6. A three-dimensional measuring apparatus as claimed in claim 1, wherein said actuator comprises:
a piezo-electric element; and
a supporting spring driven by said piezo-electric element, said supporting spring being associated with at least one of said first and second diffraction gratings.

7. A three-dimensional measuring apparatus as claimed in claim 1, wherein said actuator comprises:
a linear motor; and
a supporting spring driving by said linear motor, said supporting spring being associated with at least one of said first and second diffraction gratings.

* * * * *

UNITED STATES PATENT AND TRADEMARK OFFICE
CERTIFICATE OF CORRECTION

PATENT NO. : 5,307,153

DATED : APRIL 26, 1994

INVENTOR(S) : Tusgito MARUYAMA, et al.

It is certified that error appears in the above-indentified patent and that said Letters Patent is hereby corrected as shown below:

Col. 3, line 22, "conventional a" should be --conventional--.

Col. 5, line 62, "multislit" should be --multi-slit--.

Col. 8, line 29, "farming" should be --forming--.

Col 11, line 18, "weight" should be --weighted--.

Col. 12, line 43, "pattern." should be --patterns.--.

Col. 13, line 23, "2" should be --$2^0$--.

Col. 15, line 40, "The and the" should be --The--;
line 60, "Thus and thus" should be --Thus--.

Col. 17, line 62, "which" should be deleted.

Col. 19, line 47, "$0x2^01x2^1+0x2^2=2$" should be --$0x2^0+1x2^1+0x2^2=2$--.

Col. 21, line 10, "of number the of" should be --of the number of--.

Signed and Sealed this

Twentieth Day of September, 1994

Attest:

BRUCE LEHMAN

*Attesting Officer*  *Commissioner of Patents and Trademarks*